(12) United States Patent
Lavian et al.

(10) Patent No.: US 8,223,931 B1
(45) Date of Patent: *Jul. 17, 2012

(54) SYSTEMS AND METHODS FOR VISUAL PRESENTATION AND SELECTION OF IVR MENU

(76) Inventors: Tal Lavian, Sunnyvale, CA (US); Zvi Or-Bach, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/409,106

(22) Filed: Mar. 1, 2012

(51) Int. Cl.
*H04M 11/06* (2006.01)
*H04Q 11/00* (2006.01)
*G06F 13/12* (2006.01)
*G10L 17/00* (2006.01)

(52) U.S. Cl. .................... 379/88.13; 370/250; 370/260; 379/88.04; 379/88.17; 379/88.22; 379/88.23; 379/93.23; 463/42; 704/246; 704/270.1; 704/275; 705/14.49; 709/224; 710/63; 715/756

(58) Field of Classification Search .............. 370/250, 370/260; 379/88.04, 88.17, 88.18, 88.22, 379/88.23, 88.16, 93.23; 463/42; 704/246, 704/270.1, 275; 710/63; 705/14.49; 709/224; 715/756

See application file for complete search history.

(56) References Cited

U.S. PATENT DOCUMENTS

| | | | | |
|---|---|---|---|---|
| 5,802,526 A * | 9/1998 | Fawcett et al. | ............. | 379/88.13 |
| 6,920,425 B1 * | 7/2005 | Will et al. | ................ | 704/275 |
| 7,054,811 B2 * | 5/2006 | Barzilay | ................ | 704/246 |
| 7,215,743 B2 * | 5/2007 | Creamer et al. | ............ | 379/88.18 |
| 7,970,110 B2 * | 6/2011 | Reynolds | ................ | 379/88.18 |
| 8,000,454 B1 * | 8/2011 | Or-Bach et al. | ............ | 379/88.18 |
| 8,054,952 B1 * | 11/2011 | Or-Bach et al. | ............ | 379/88.18 |
| 8,155,280 B1 * | 4/2012 | Or-Bach et al. | ............ | 379/88.13 |
| 8,160,215 B2 * | 4/2012 | Or-Bach et al. | ............ | 379/88.18 |
| 2004/0120479 A1 * | 6/2004 | Creamer et al. | ............ | 379/88.22 |
| 2004/0122941 A1 * | 6/2004 | Creamer et al. | ................ | 709/224 |
| 2006/0035712 A1 * | 2/2006 | Eastman et al. | ................ | 463/42 |
| 2006/0285662 A1 * | 12/2006 | Yin et al. | ................ | 379/88.16 |
| 2007/0195706 A1 * | 8/2007 | Sink | ................ | 370/250 |
| 2008/0226042 A1 * | 9/2008 | Singh | ................ | 379/88.04 |
| 2009/0097619 A1 * | 4/2009 | Jackson et al. | ............ | 379/88.17 |
| 2009/0110162 A1 * | 4/2009 | Chatterjee | ................ | 379/93.23 |
| 2009/0154666 A1 * | 6/2009 | Rios et al. | ................ | 379/88.18 |
| 2009/0249225 A1 * | 10/2009 | Beswick et al. | ............ | 715/756 |
| 2009/0268883 A1 * | 10/2009 | Agapi et al. | ................ | 379/88.04 |
| 2010/0110938 A1 * | 5/2010 | Gavish et al. | ................ | 370/260 |
| 2010/0166158 A1 * | 7/2010 | Costello et al. | ............ | 379/88.04 |
| 2011/0112901 A1 * | 5/2011 | Fried et al. | ................ | 705/14.49 |
| 2011/0202350 A1 * | 8/2011 | Barnes | ................ | 704/270.1 |
| 2011/0225330 A1 * | 9/2011 | Lavian et al. | ................ | 710/63 |
| 2012/0063574 A1 * | 3/2012 | Or-Bach et al. | ............ | 379/88.23 |

* cited by examiner

*Primary Examiner* — Gerald Gauthier

(57) ABSTRACT

Embodiments of the invention provide a system for enhancing user interaction with Interactive Voice Response (IVR) destinations, the system comprising: a processor; and a memory coupled to the processor, the memory comprising: data encoding a database, the database comprising a list of telephone numbers associated with one or more destinations implementing an IVR; instructions executable by the processor for automatically communicating with at least one user; and instructions executable by the processor to pull at least one menu from the database and display the menu to the at least one user, wherein the menu is associated with a telephone number dialed by the at least one user, and wherein the menu comprises at least one icon.

30 Claims, 32 Drawing Sheets

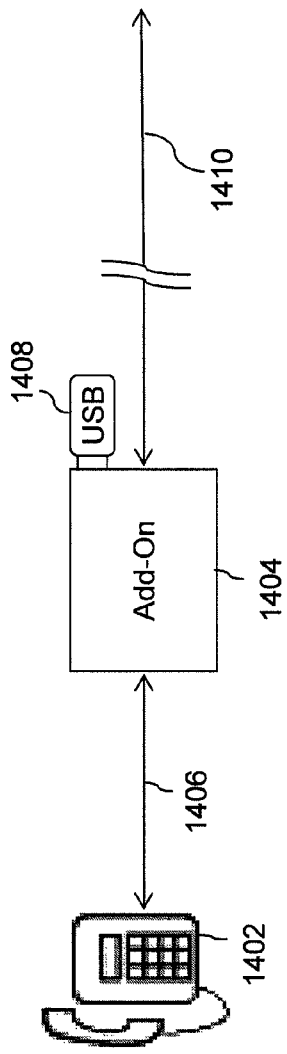
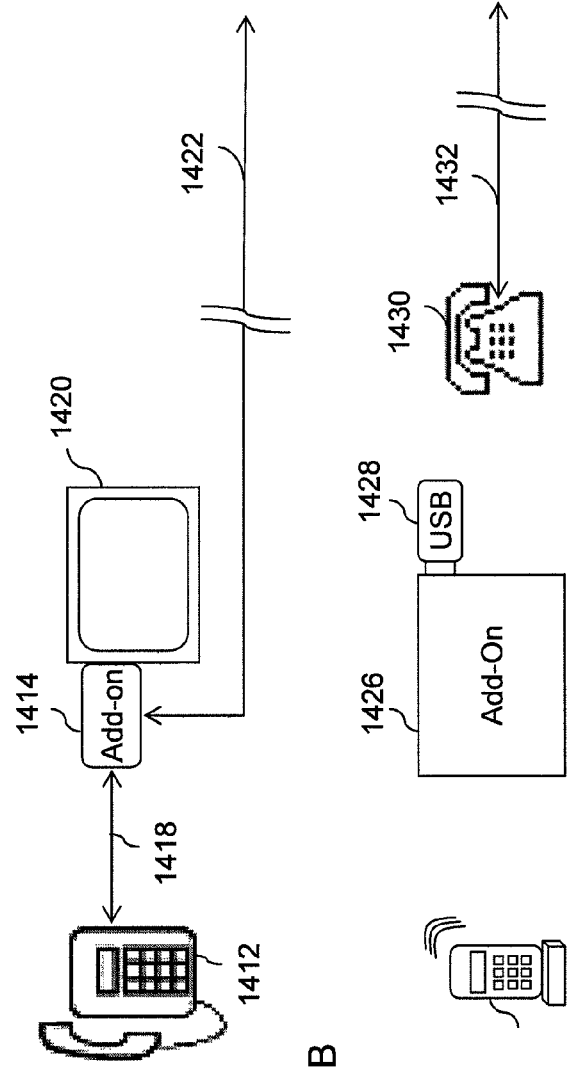
FIG. 14A
FIG. 14B
FIG. 14C

SYSTEMS AND METHODS FOR VISUAL PRESENTATION AND SELECTION OF IVR MENU

FIELD OF THE INVENTION

The invention relates to Interactive Voice Response (IVR) system and more specifically the invention relates to visual selection of IVR option from a caller device.

BACKGROUND OF THE INVENTION

Interactive Voice Response (IVR) technology is generally used to detect voice and key inputs from a caller. Various organizations such as banks, insurance companies, and other service providers use IVR technology to manage calls from their customers. Typically, IVR systems are used by organizations that have high call volumes. An objective for implementing the IVR systems is to provide the customers with a quick and good experience. Moreover, the cost of providing the services is reduced.

Generally, when the caller calls a destination, such as a bank, an automated audio menu is played. The audio IVR menu can contain instructions to provide instant services such as account balance inquiry when the destination is a bank. Further, audio menu can provide options for the caller to connect to a desired end inside the destination. For example, the menu may direct the caller to press various keys on a telephone to connect to a particular department or agent. The audio IVR menu is designed specific to a destination. Therefore, each destination or organization may have different IVR menus. Further, the IVR menu in an organization can be based on the type of departments, type of services, customer care executives or agents and so forth. For example, an IVR menu of a bank may include options related to the account details of the caller, while an IVR menu of a pizzeria may contain options to order or select a pizza.

Typically, the caller calling the destination may have to listen and follow instructions on the menu to get a desired response or a function performed. Therefore, the process can be time consuming. Moreover, in case the caller provides an incorrect input, the complete process may have to be repeated. Furthermore, the IVR menu for an organization may be updated or changed regularly. For example, extension numbers inside an organization may be changed and correspondingly, the extension numbers associated with the IVR menu may be updated. As a result, a frequent caller may not be able to reach a desired end by remembering a combination of numbers. Therefore, the caller may become frustrated with the IVR systems.

Some prior art try to address this problem by providing visual form of IVR. These prior arts display the IVR menu graphically on a caller device. U.S. Pat. No. 7,215,743 assigned to International Business Machines Corporation and a published U.S. patent application with Ser. No. 11/957,605, filed Dec. 17, 2007 and assigned to Motorola Inc., provides the IVR menu of the destination in a visual form to the caller. The caller can select the options from the IVR menu without listening to the complete audio IVR menu. However, the IVR menu displayed on the caller device is stored on an IVR server at the destination end. As a result, the visual IVR menu is specific to the destination and only the IVR of the destination dialed is displayed. Further, the IVR menu may be required to be configured on the server of the destination to display it to the caller, as disclosed in U.S. Pat. No. 7,092,738 assigned to International Business Machines Corporation. A U.S. patent application Ser. No. 11/467,548, filed Aug. 26, 2006 discloses sending digital signals from the destination to the caller device. Thereafter, the digital signals are processed by the caller device for presenting a visual display of the IVR menu. These techniques therefore, require each destination to set-up hardware, software and other facilities to be deployed for providing visual IVR servers.

Another existing technique as disclosed in U.S. Pat. No. 6,560,320 assigned to International Business Machines Corporation enables an operator of the IVR to send customized signals to the caller for generating and displaying graphical elements on the device of the caller. Thereafter, the caller can respond by selecting options through touch-screen interface of the device. Dual Tone Multi frequency (DTMF) signals of the IVR. However, this technique requires a specifically configured device to interpret the codes sent as Dual Tone Multi frequency (DTMF) signals for generating the graphics. Moreover, an operator is required to present the graphics to the caller. Furthermore, specialized software and hardware are required at the operator to design and generate DTMF codes. Therefore, the technique faces various practical limitations. Further, a U.S. Pat. No. 7,027,990 assigned to Lester Sussman, discloses visual menus for a touch-tone telephone with an embedded computer. In this case the text menus may be pre-loaded into the telephone of the caller as text menus. Therefore, when the caller dials the destination, an associated text menu is displayed on a screen. However, this technique is limited to touch-tone telephones with embedded computer. Another existing technique as disclosed in U.S. patent application Ser. No. 11/957,605, filed on Dec. 17, 2007 and assigned to Motorola Inc., provides a directory of an IVR system in the form of, for example, a menu tree, on screen of the caller device. However, the menu tree is provided to the caller device by a remote server. Another existing technique discloses sending messages such as Short Messaging Service (SMS) to the caller device corresponding to the audible IVR menu. Such technique is disclosed in U.S. patent application Ser. No. 11/877,952, filed Oct. 24, 2007. However, the message functions only as a visual aid and the caller is still required to listen and respond to the audio IVR menu. A published PCT Application WO 2008/086320, filed Jan. 7, 2008 and assigned to Snapin Software Inc., displays IVR menu to the caller's device after connecting a call with the destination.

Generally, the IVR menus of the organizations are in form of audible menu. Moreover, there are a large number of organizations that use IVR menus. Therefore, converting the audible menus to visual menus can be time consuming. An existing technique, as disclosed in U.S. Pat. No. 6,920,425 assigned to Nortel Networks Limited, discloses an automated script to convert the audible menus scripts to visual menu scripts. However, the audible menus scripts must be available in a particular format to enable the conversion. Furthermore, the audio menu scripts must be available or downloadable for the program to function. As a result, only the audio menus scripts that are available can be converted to visual menu scripts. Furthermore, the device of the caller must be designed or programmed to understand the visual menu scripts. A U.S. Pat. No. 6,885,737 assigned to BellSouth Intellectual Property Corp., discloses a web interface for displaying the IVR menu. However, a server is required to transmit the IVR menu to the caller's device.

Various organizations encourage the customers to call them for information on their products or services, or for helping existing customers. Generally, a contact number is provided by the organizations on their website as a button. Therefore, when the customer presses the button a form is displayed. The customer then enters his contact number where an executive from the organization may call. However, this may be time consuming for the customer. Moreover, the customer may be not being able to talk to another executive during the call in case the on-line executive is not able to satisfy the customer. U.S. patent application with Ser. No. 12/049,021, filed Mar. 14, 2008 and assigned to Harprit Singh, provides methods and systems for displaying an IVR menu, when the caller clicks a link on a webpage provided by the organization. However, the customer is still required to request the webpage with embedded information from a server of the organization. Moreover, the methods and systems are limited to the organizations that provide the required webpage to the customers. Other technologies include U.S. patent application with Ser. No. 11/877,952 filed Oct. 24, 2007 and assigned to International Business Machine Corporation.

The effectiveness of providing the IVR in visual form is discussed in a technical paper titled, 'The Benefits of Augmenting Telephone Voice Menu Navigation with Visual Browsing and Search' by Min Yin et al. The paper discusses a setup where visual content of the IVR is sent from a service provider to a computer connected to a mobile phone. However, the technique discussed in the paper is limited to the visual content provided by the service provider's end, after the connection is established. Moreover, the providers are required to individually set up the hardware and services for providing visual content.

As discussed above the existing technologies have various limitations.

SUMMARY

An aspect of the invention is to provide to a caller using a device a visual menu corresponding to an audible IVR menu of a destination.

Another aspect of the invention is to enable the caller to directly interact with the visual menu without listening to the audible IVR menu of the destination.

Yet another aspect of the invention is to provide the visual menu to the caller before establishing a connection of the device with the destination.

Another aspect of the invention is to enable the caller to interact with the visual menu by using a touch sensitive screen of the device.

Another aspect of the invention is to provide advertisements related to the destination or function of the destination dialed by the caller.

A caller may dial or select a phone number from a device of a destination. The phone number is detected by Visuphone implemented on the device to display a visual menu corresponding to the audible IVR menu of the destination. Visuphone may be hardware, an application stored as a software or firmware on the device, or a combination thereof. Visuphone may include a database of visual menus corresponding to audible IVR menus for various destinations. Thereafter, the caller may interact with the visual menu displayed on the device to establish a connection with the destination. Furthermore, Visuphone may detect and launch a VOIP application for establishing the connection. Moreover, Visuphone may provide pre-recorded or computer synthesized audio responses on behalf of the caller to the destination.

An enhanced telephone system is provided. The telephone system comprises a database that comprises one or more phone numbers and one or more menus corresponding to the phone numbers, wherein the menus comprise one or more options for selection. The telephone system comprises means for comparing a dialed number to the phone numbers in the database; means for displaying a menu based on a result of the comparison; means for enabling selection of the one or more options from the displayed menu; and means for establishing a connection with a destination of the dialed number based on the selection of the one or more options.

An enhanced telephone system is provided. The telephone system comprises a database comprising one or more phone numbers and one or more menus corresponding to the phone numbers, wherein the menus comprises one or more options for selection; means for comparing the a received number of a received call to the phone numbers in the database; means for displaying a menu based on a result of the comparison; and means for enabling selection of the one or more options from the displayed menu.

A method for providing enhanced telephony is also provided. The method comprising identifying a number dialed from a telephone system; comparing the dialed number to one or more phone numbers stored in a database, wherein the database comprises one or more menus corresponding to the phone numbers, and wherein the menus comprises one or more options for selection; and displaying on the telephone system a menu from the database based on a result of the comparison.

Another aspect of the invention is to generate a database of visual menus. The database generation could be done by successive calling the IVR and combined with voice recognition. Calling the IVR systems can be done manually by operators that will listen to options of the IVR and enter these options into the database. In this manual mode, the operator will dial IVR numbers from a list and for each of them will follow all the options in several levels and in each level, enter the menu entries into the database. This can be done to many different IVR phone numbers, by one or multiple operators. The voice menu can be recorded to for analyzing in a different process or a different time.

Another aspect of the invention is to generate a database of visual menus by a computer system. Combination of hardware and software that is connected to phone system and automatically dials the IVR phone numbers, record the different options of the voice menu, analyze the voice menu and generate and enter the different entries into the database. The system will generate the voice tone that simulates the relevant touchtone of a phone number pressed. This process will be done in several levels until covering all the entries in all the levels of the specific IVR system. This process is done for all the IVR phone number in the list.

Additional alternative is to access the IVR internal database and download the menu. This approach requires the collaboration with the IVR maker and at least permission from the IVR owner. Having both a system could be build to access IVR using their maintenance port, which is often connected to the Internet. Accordingly, the system would access the IVR and once authorized by the IVR owner it will download the internal file representing the IVR menu, which could be called the IVR customization record. The downloaded file would then be converted to visual menu by utility that could be design according to the format, which could be provided by the IVR maker.

Another aspect of the invention is to provide updates to the visual menus stored in the device.

Another aspect of the invention is to provide the visual menu when the call is forwarded from one destination to another.

Another aspect of the invention is to provide visual menus on electronic devices with screens that are connected to Visuphone.

Additional aspect of the invention is an automatic learning of user choice and uses that for assisting the user in his future calls.

BRIEF DESCRIPTION OF THE DRAWINGS

Figure 1A:
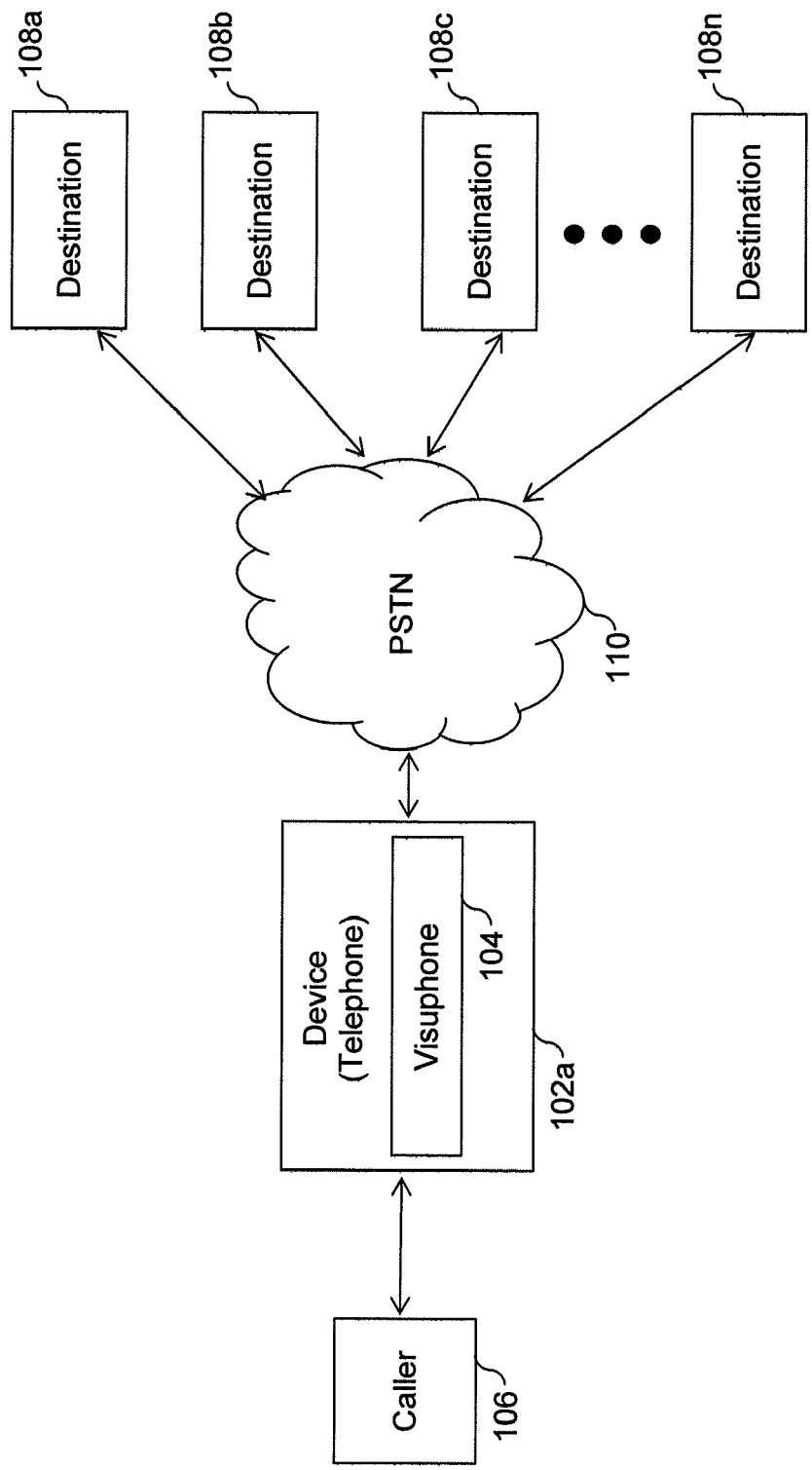
Figure 1B:
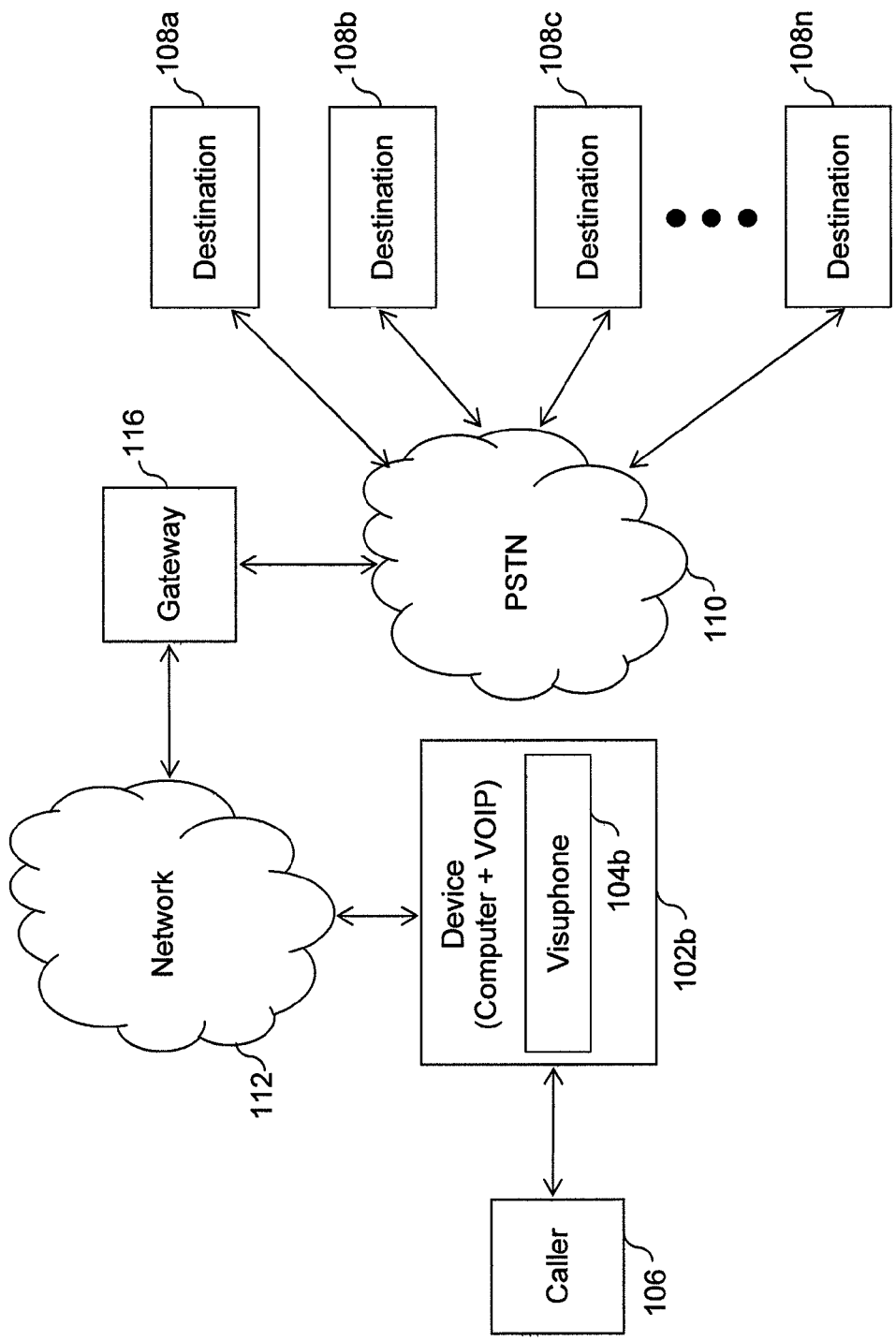
Figure 1C:
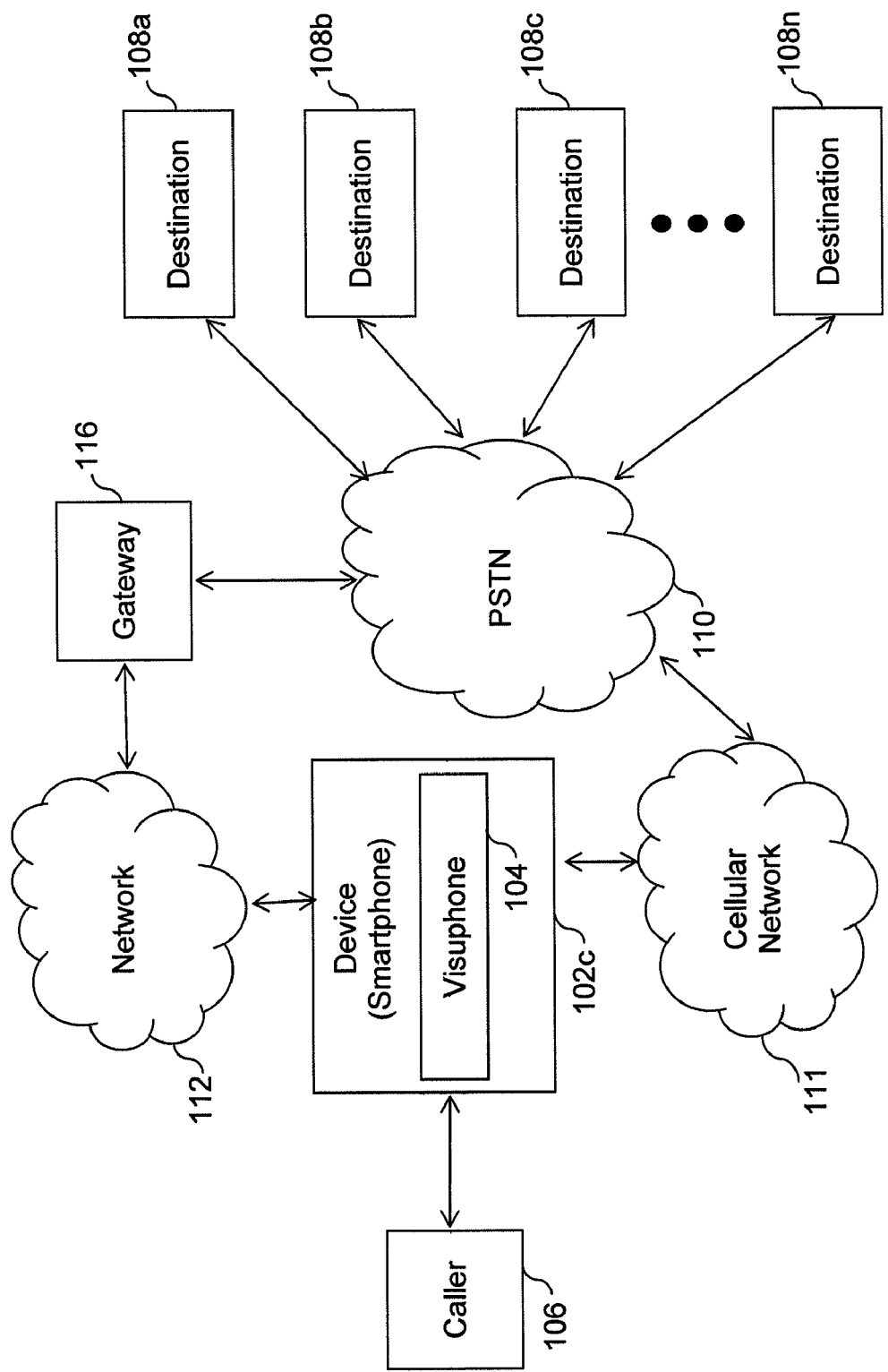
Figure 2A:
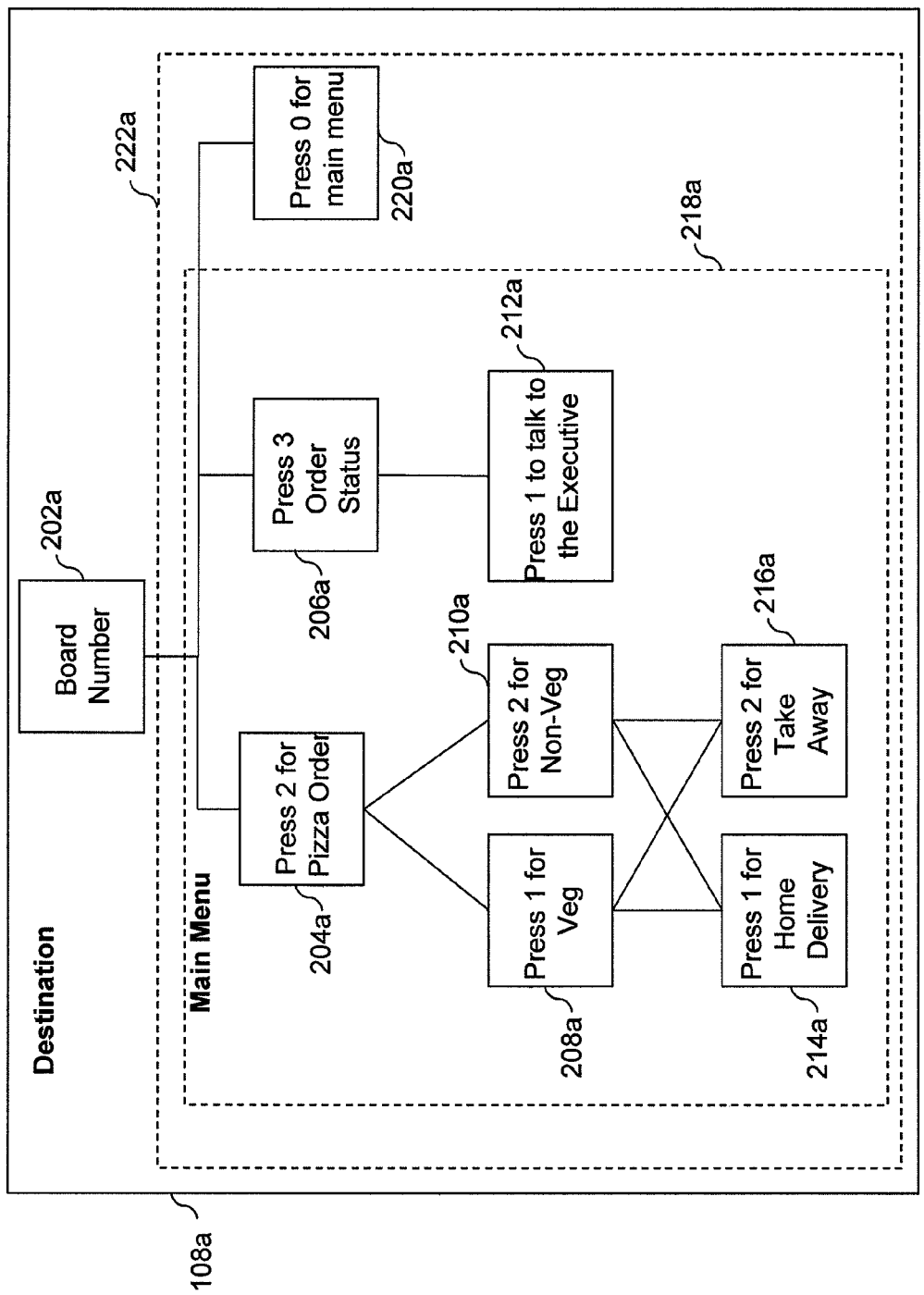
Figure 2B:
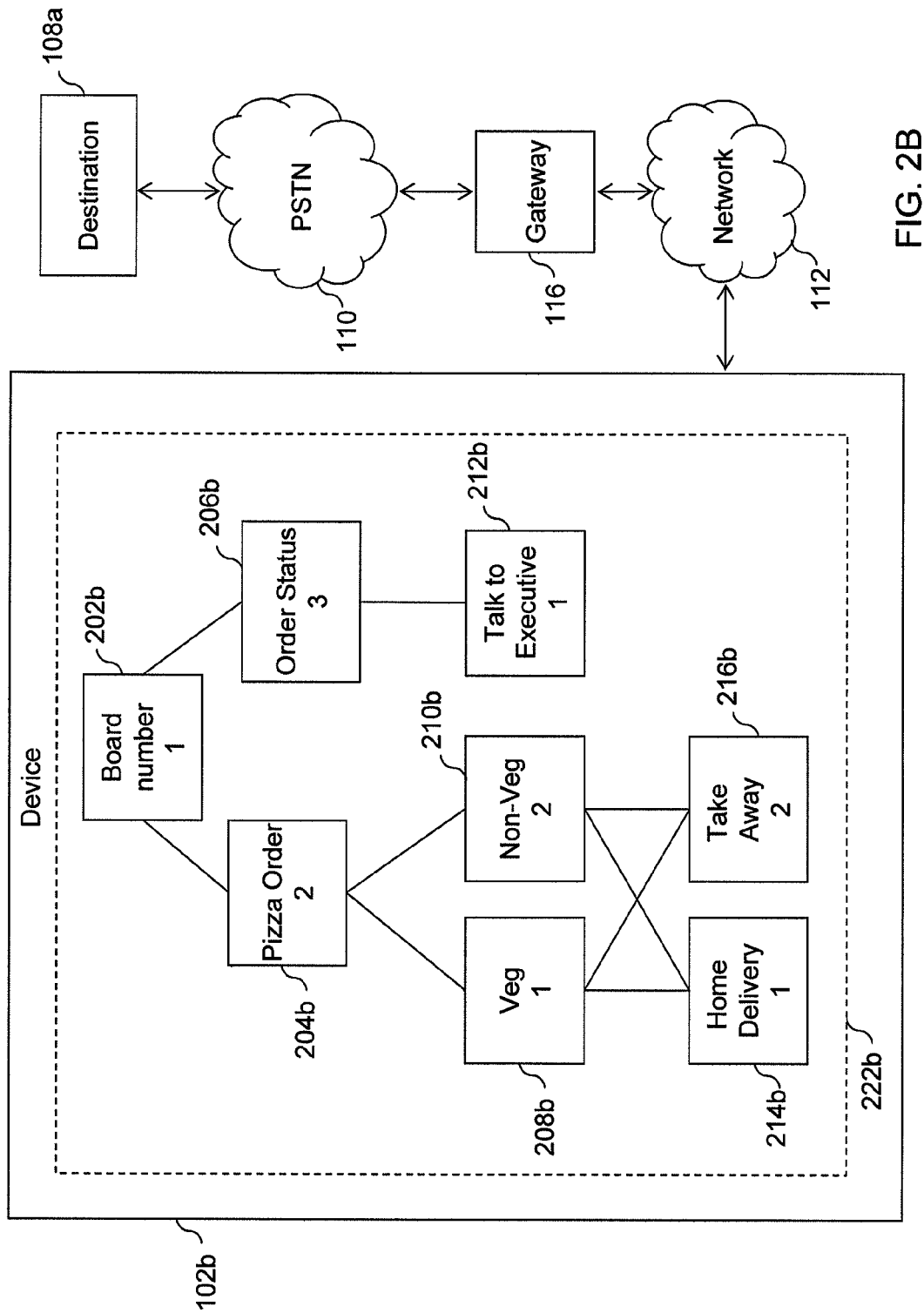
Figure 2C:
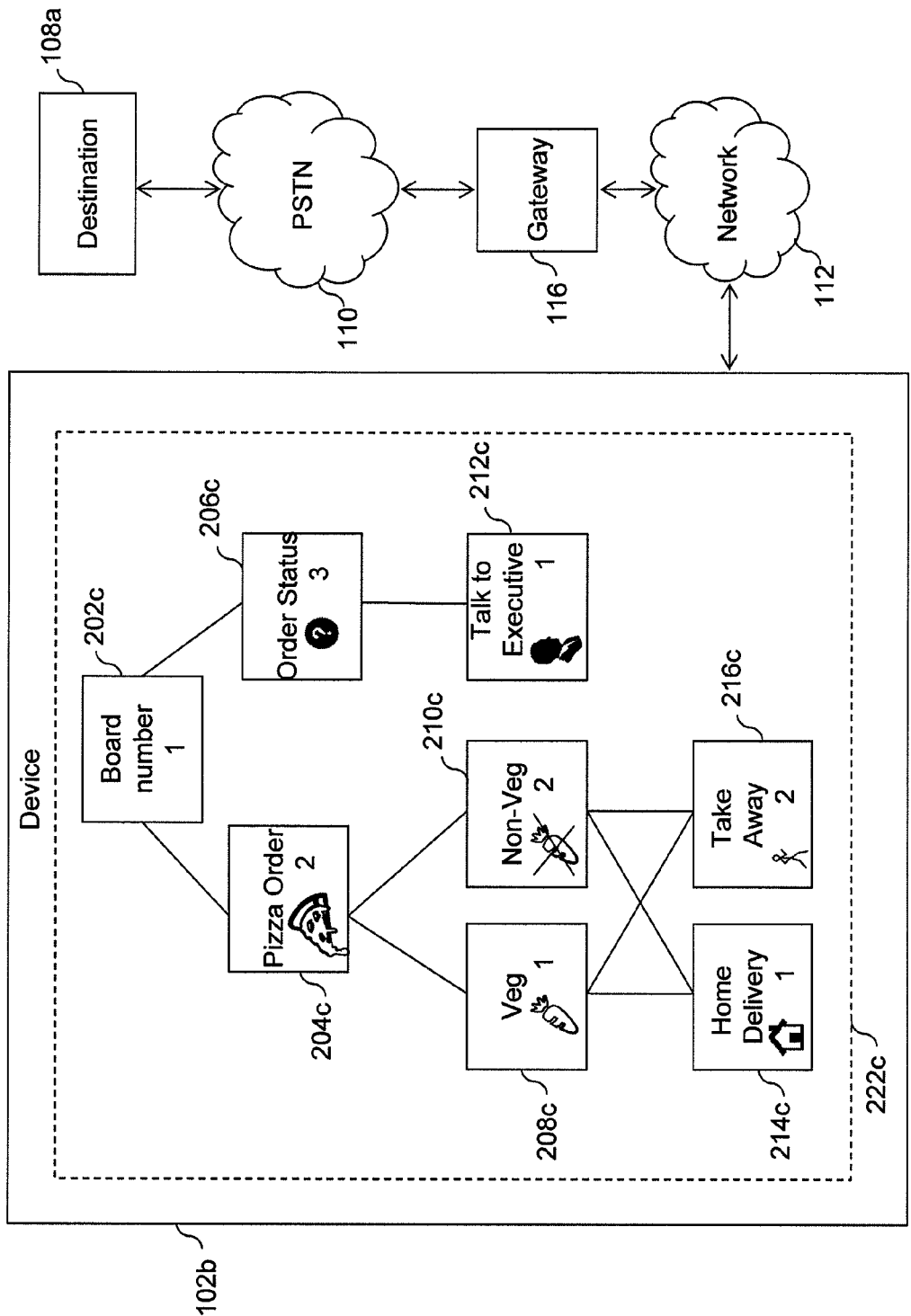
Figure 2D:
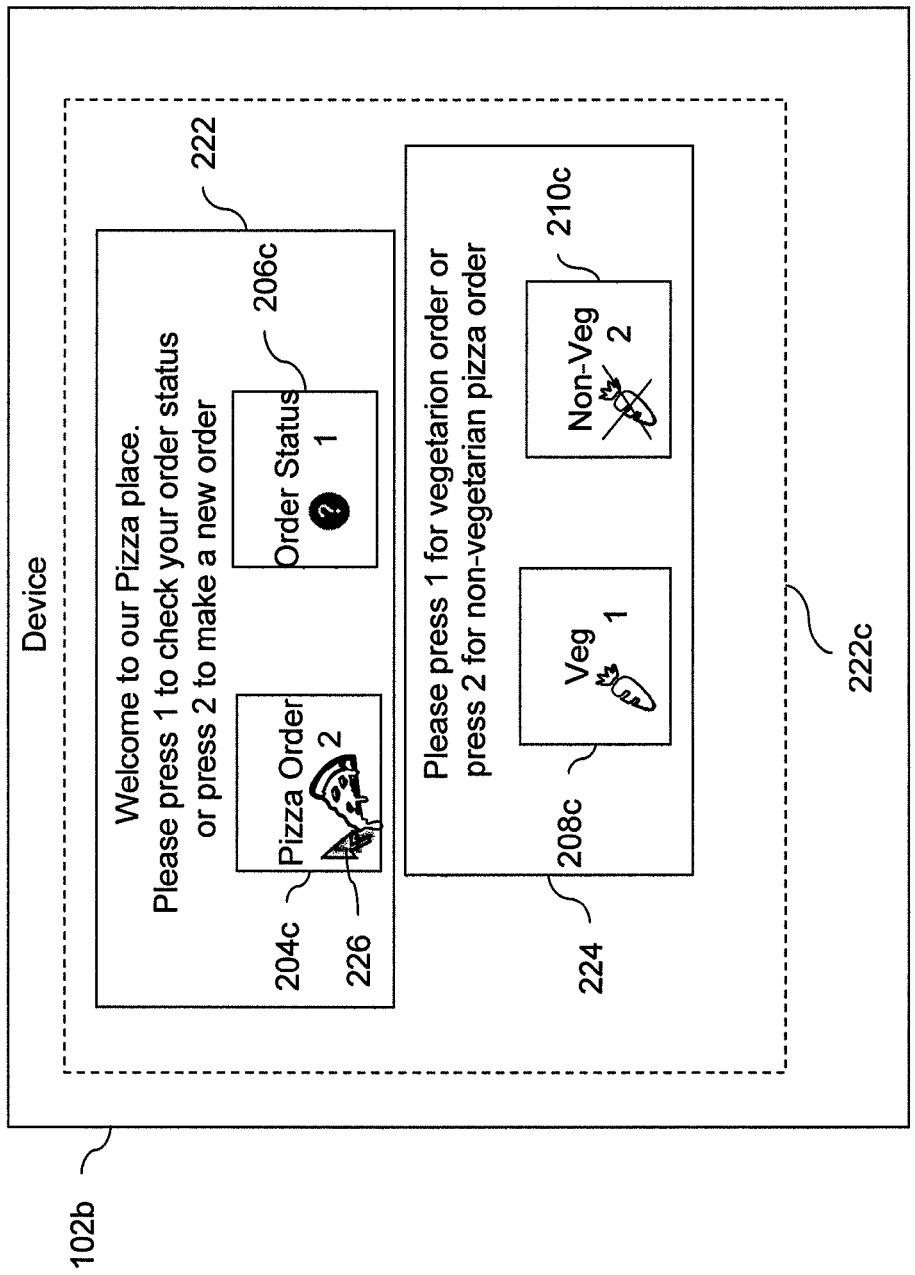
Figure 3A:
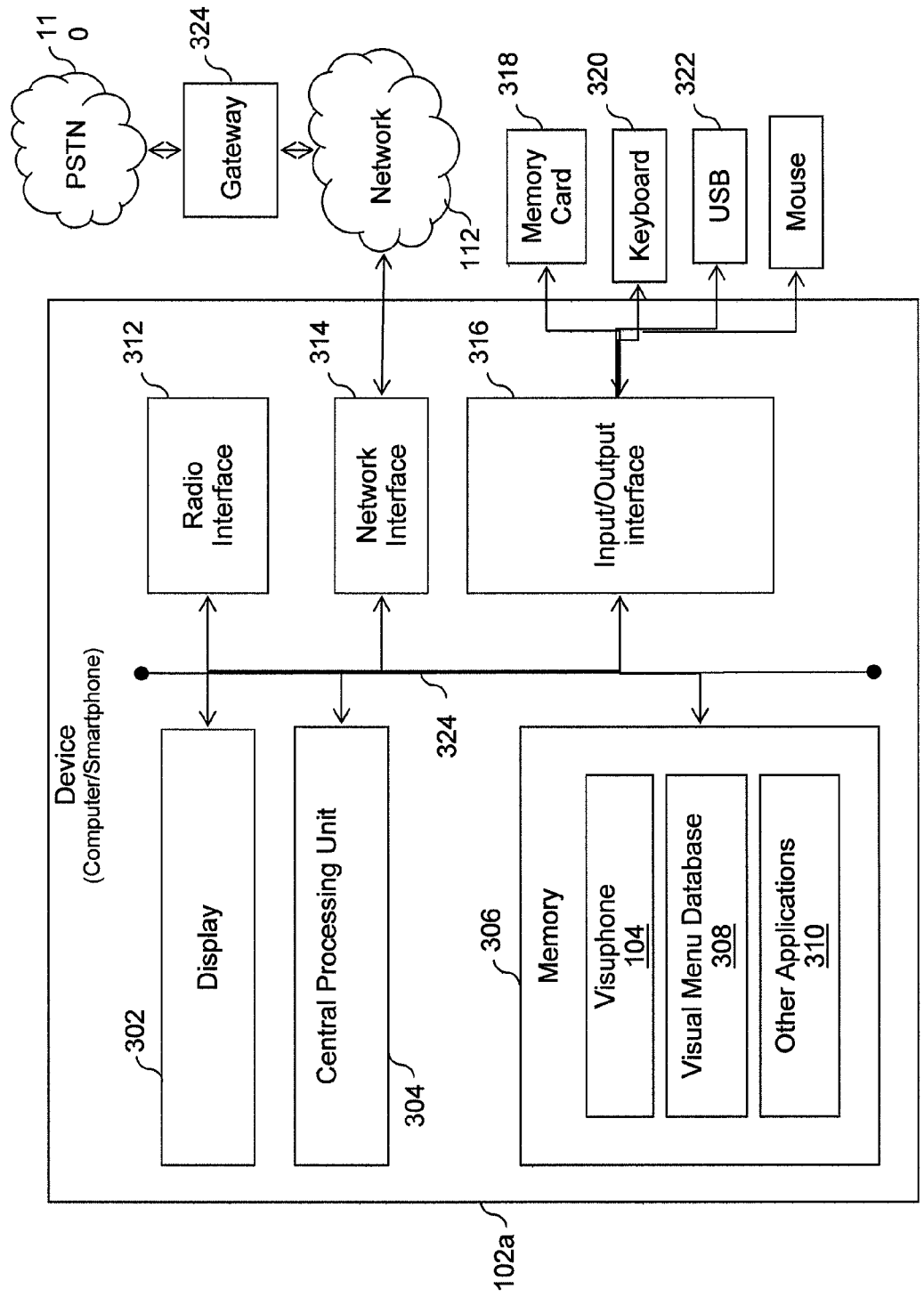
Figure 3B:
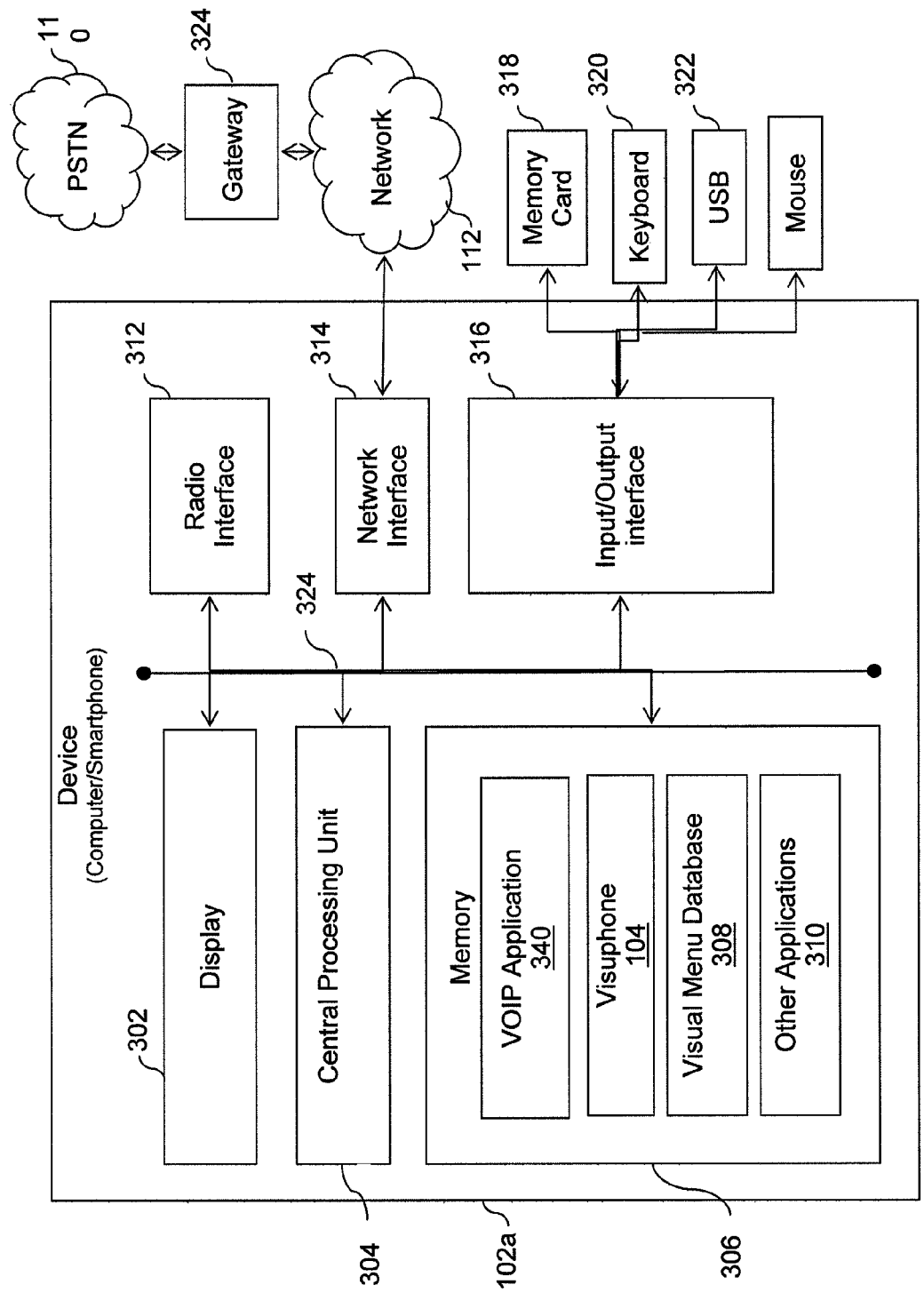
Figure 4:
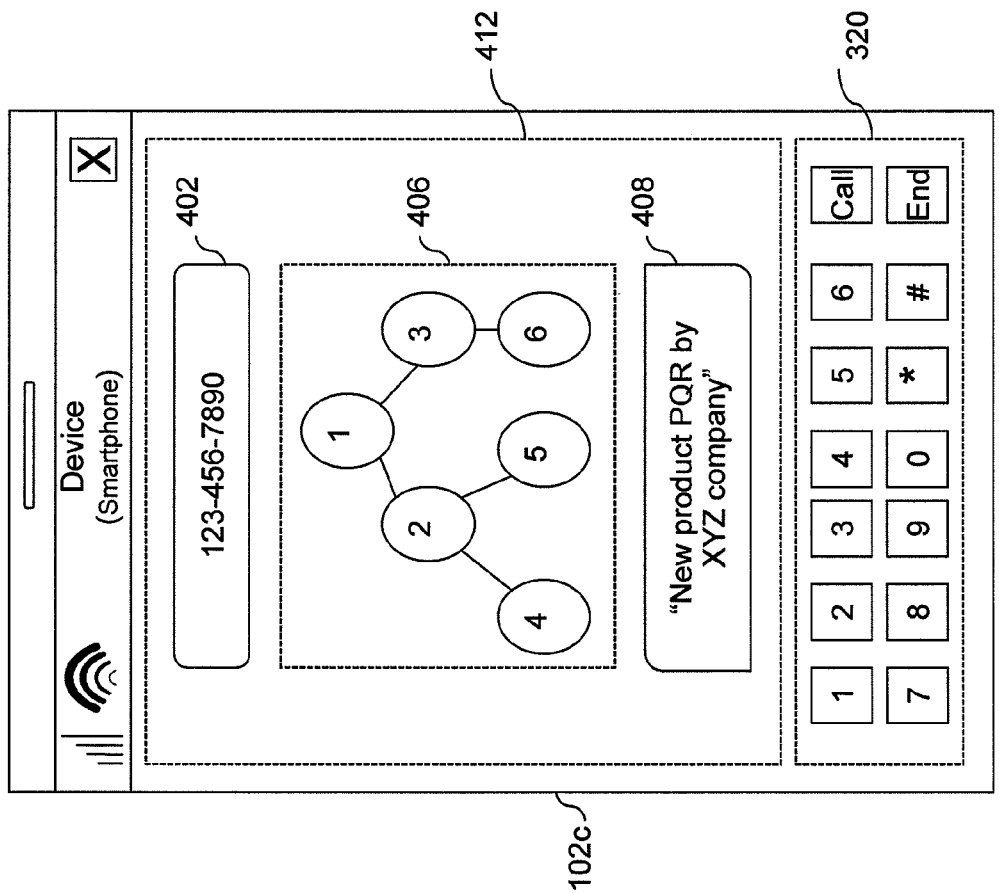
Figure 5:
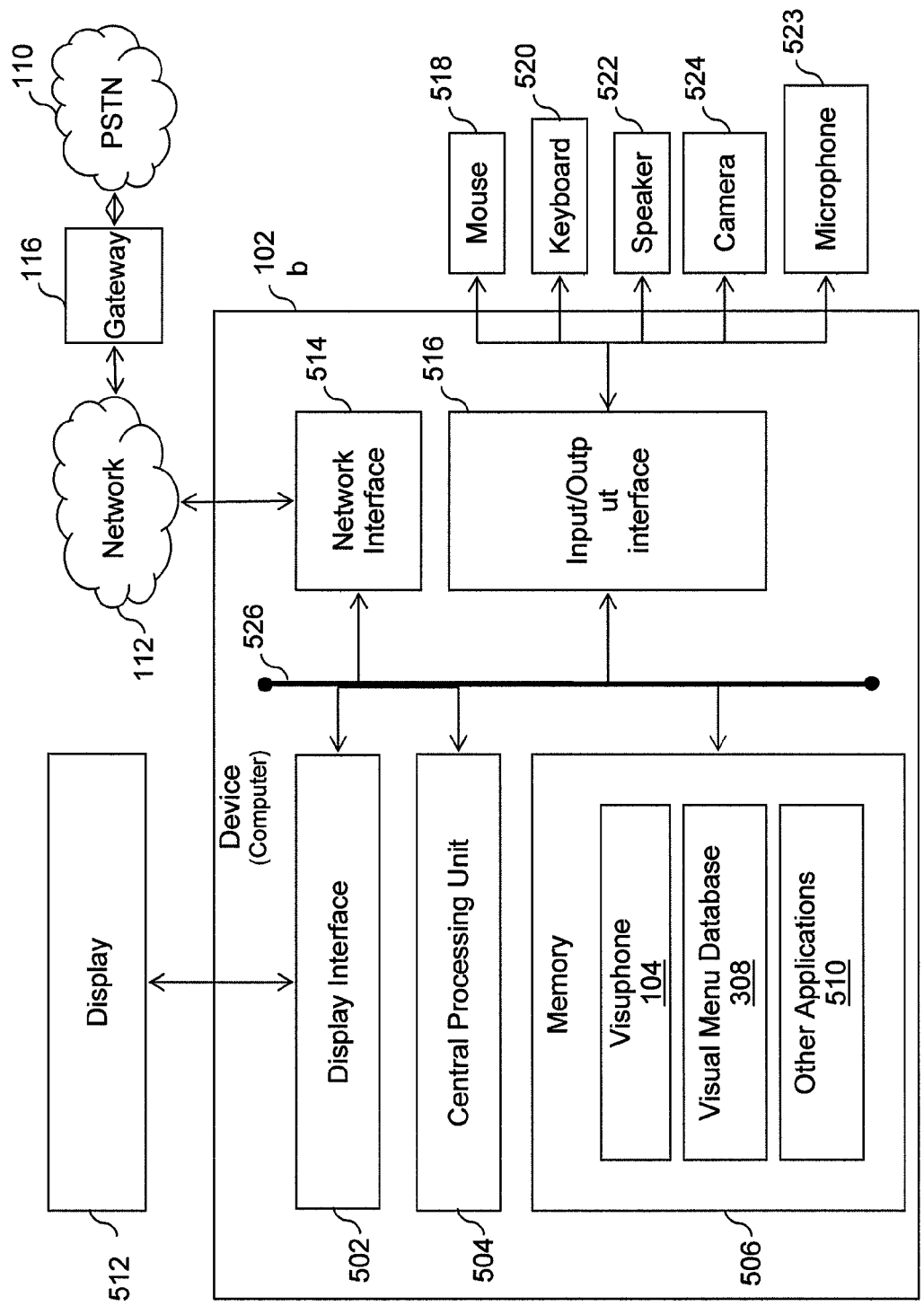
Figure 6:
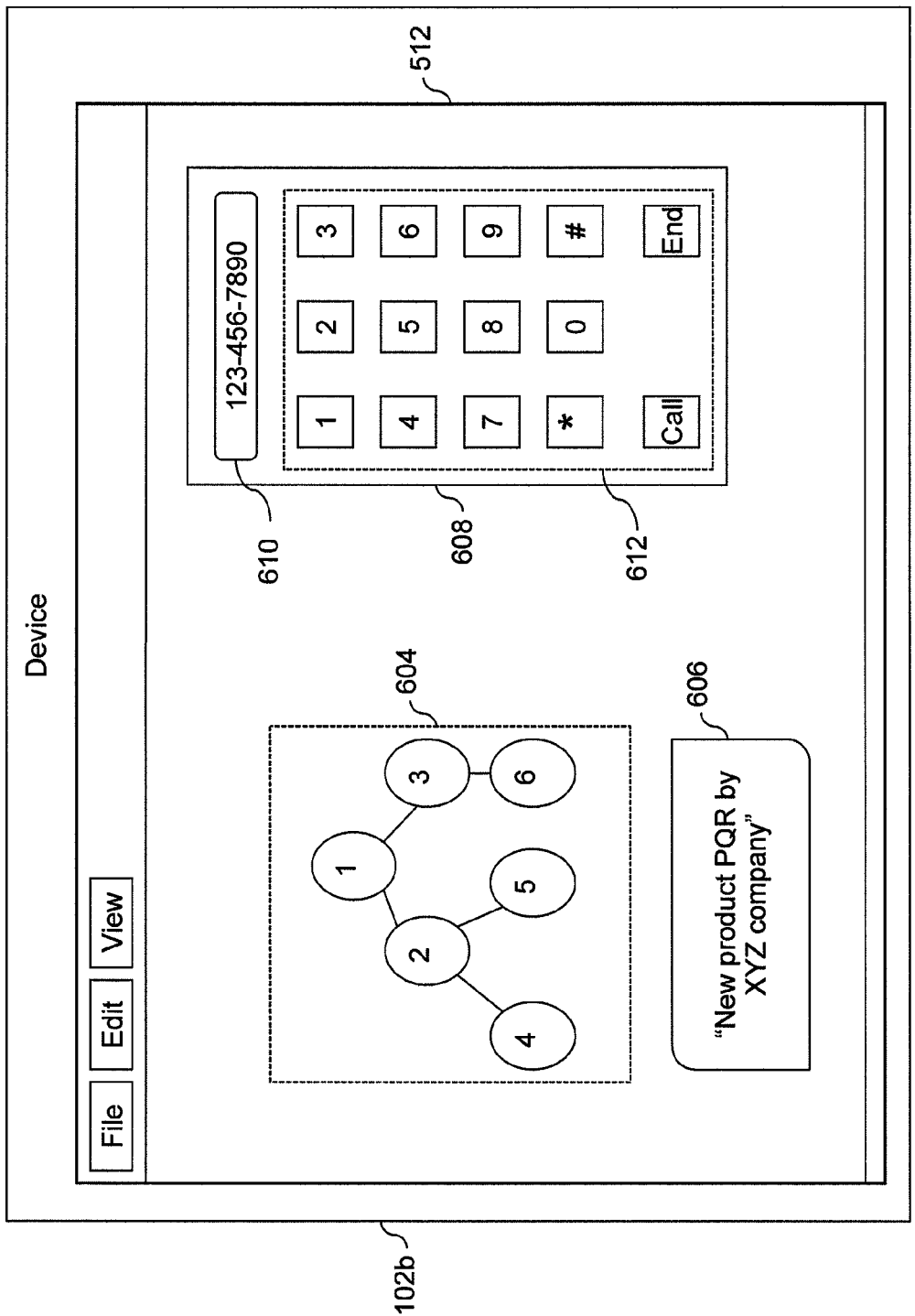
Figure 7:
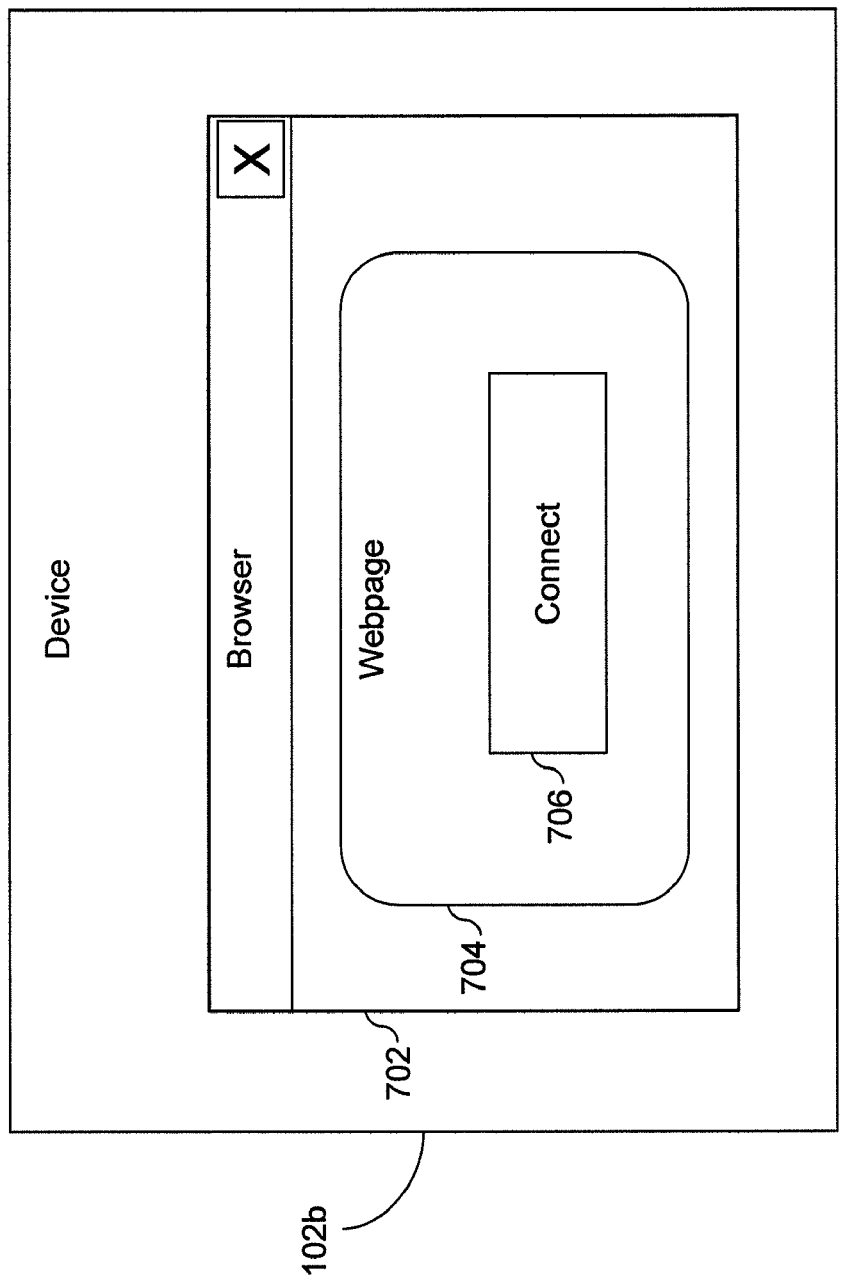
Figure 8:
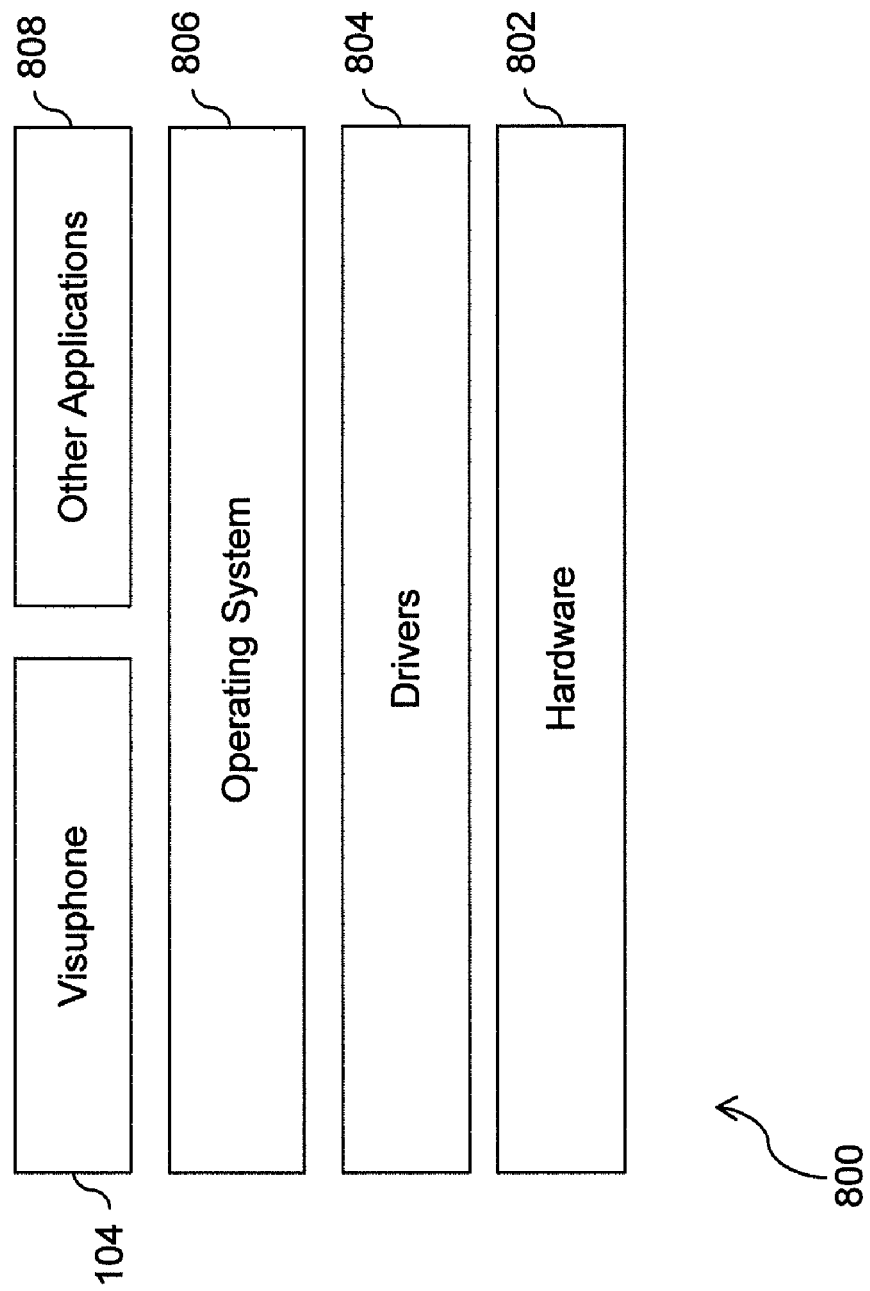
Figure 9:
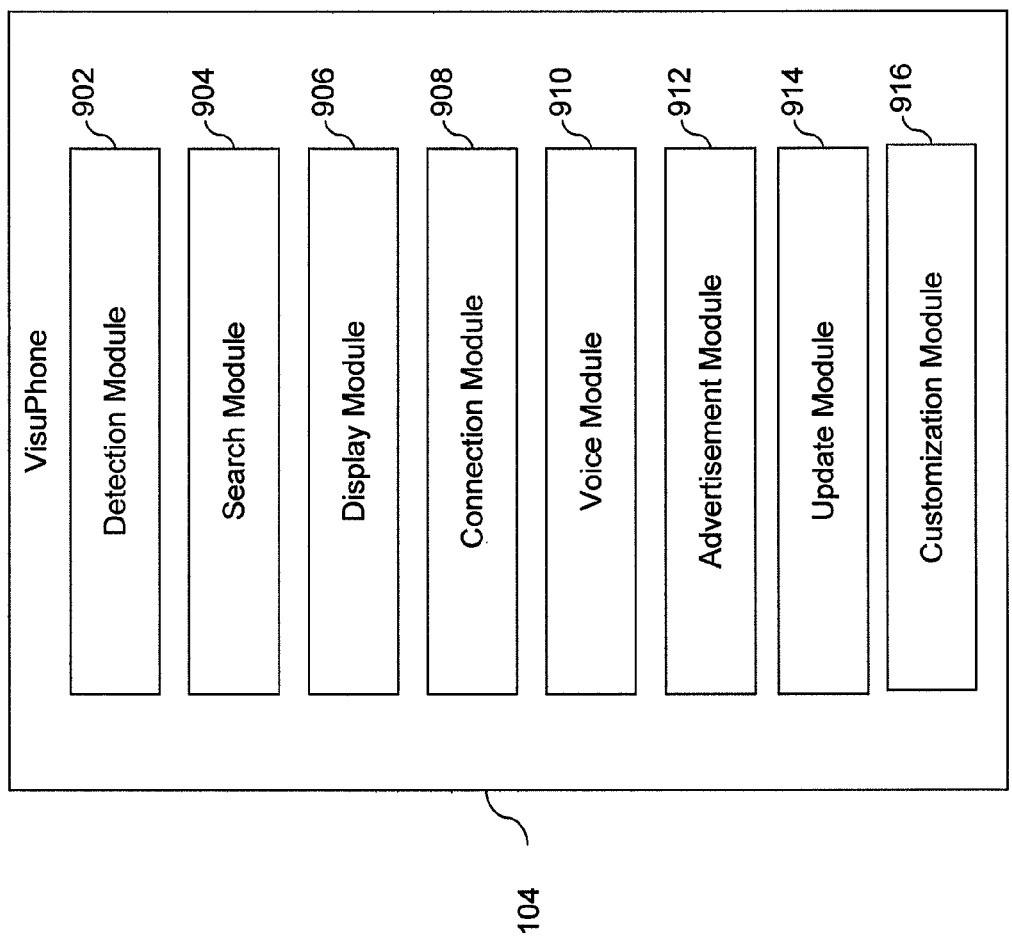
Figure 10:
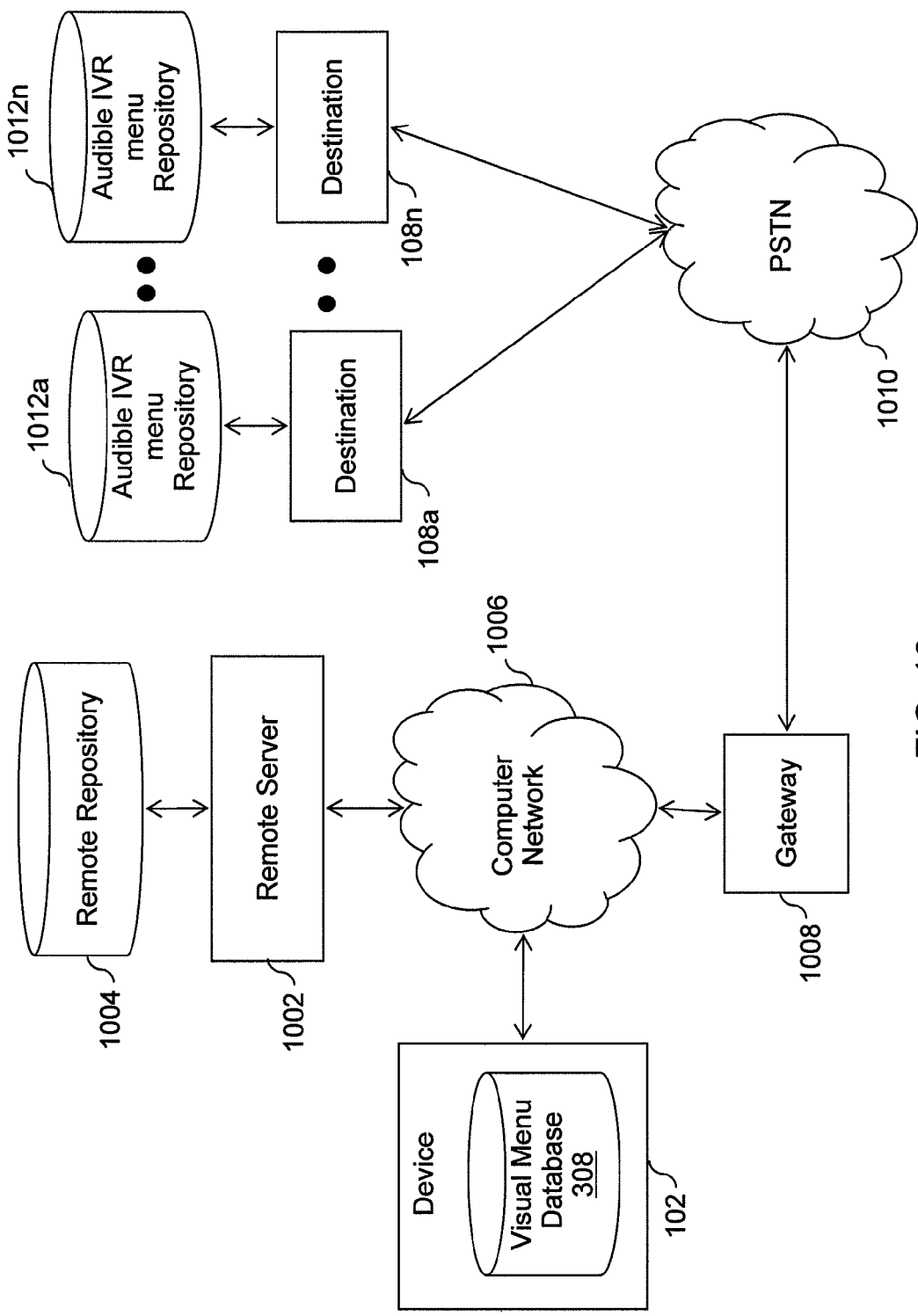
Figure 11:
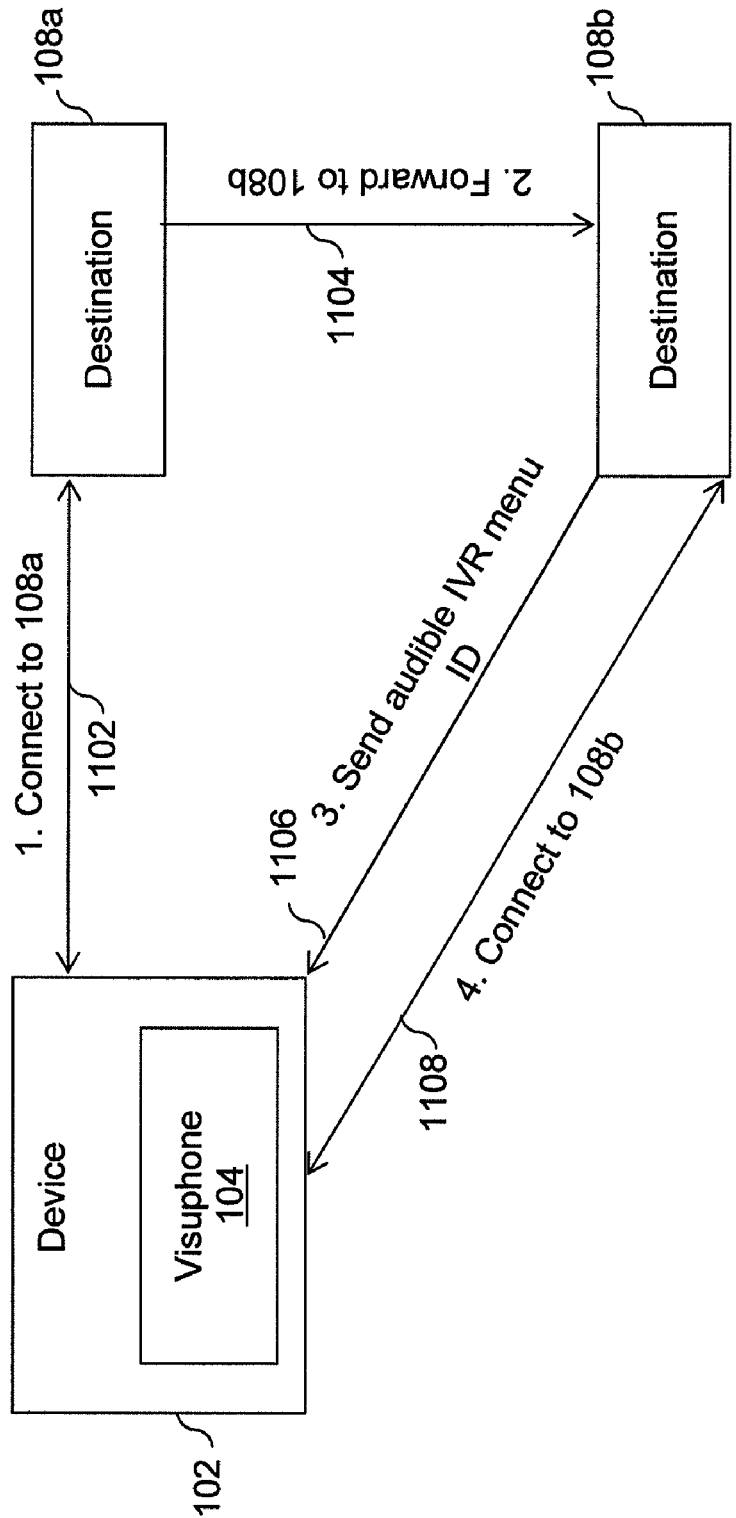
Figure 12:
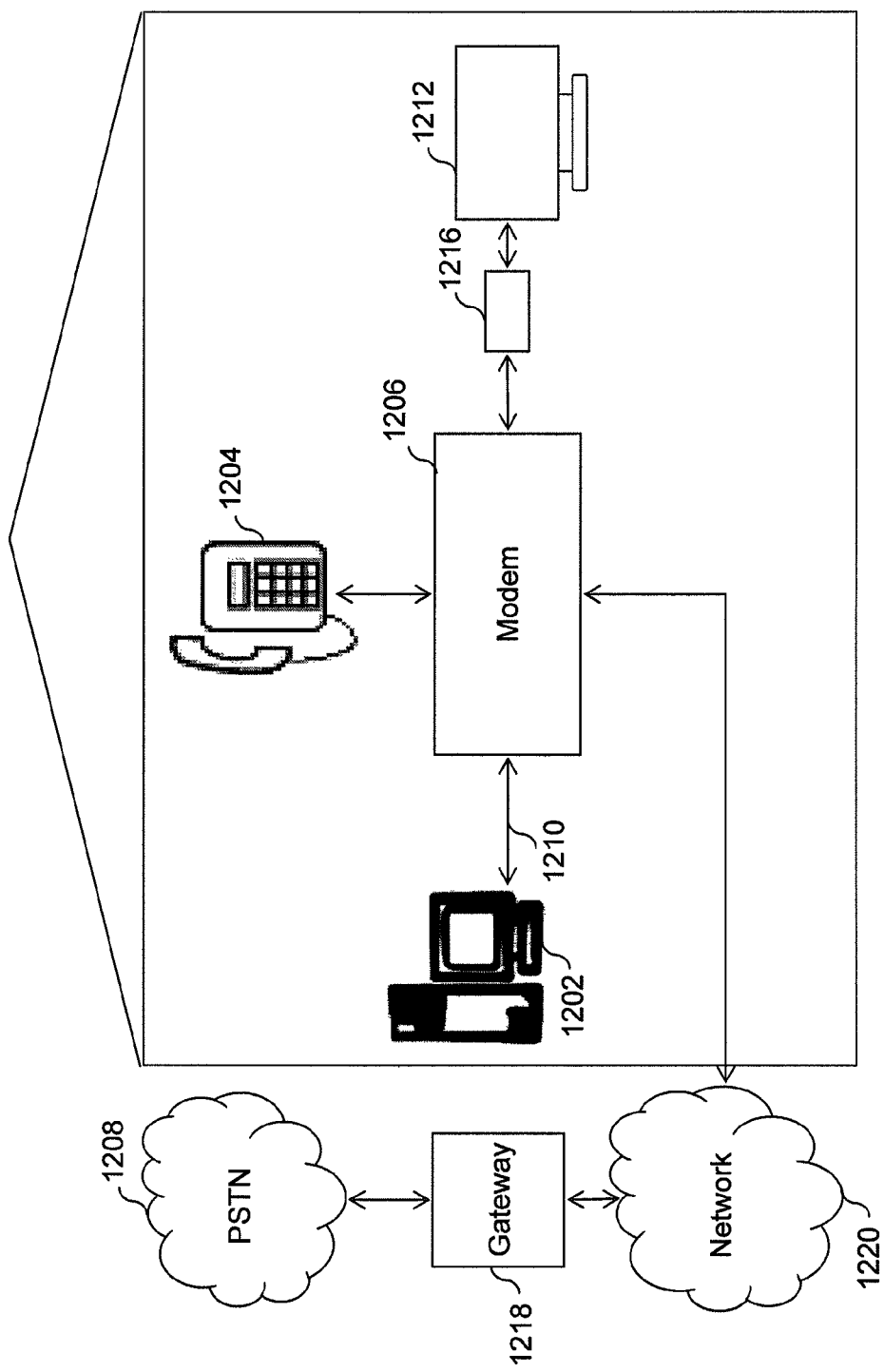
Figure 13:
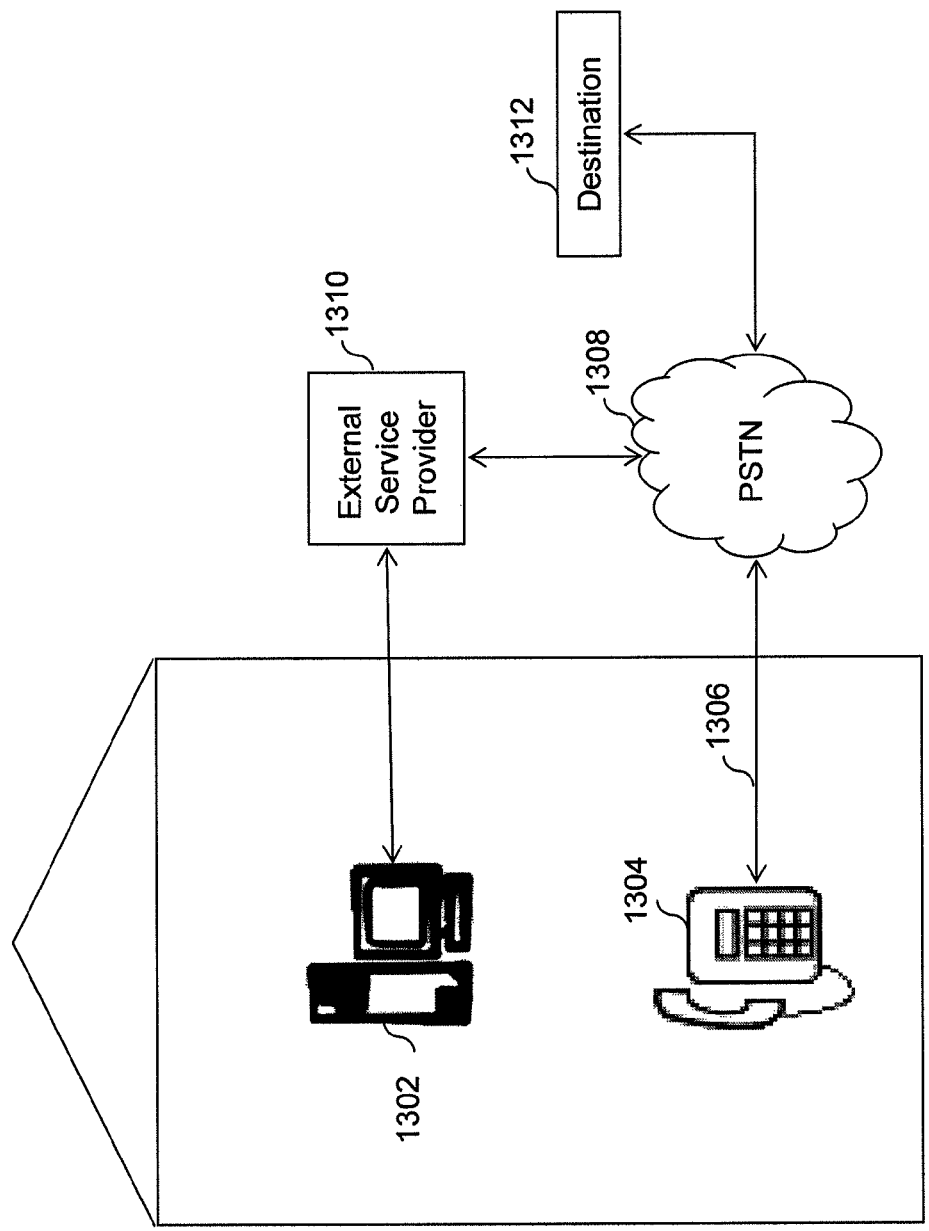
Figure 16:
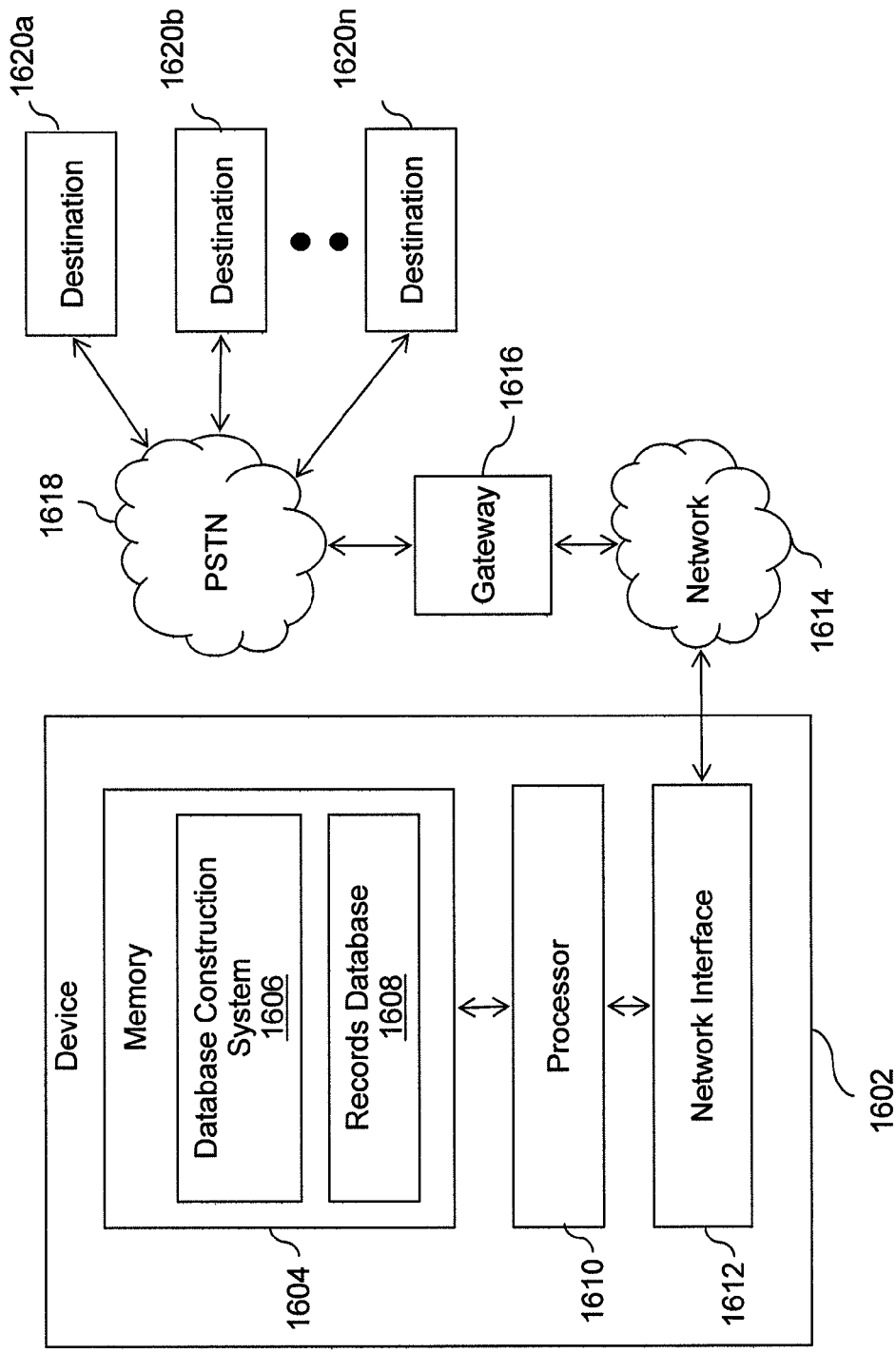
Figure 17A:
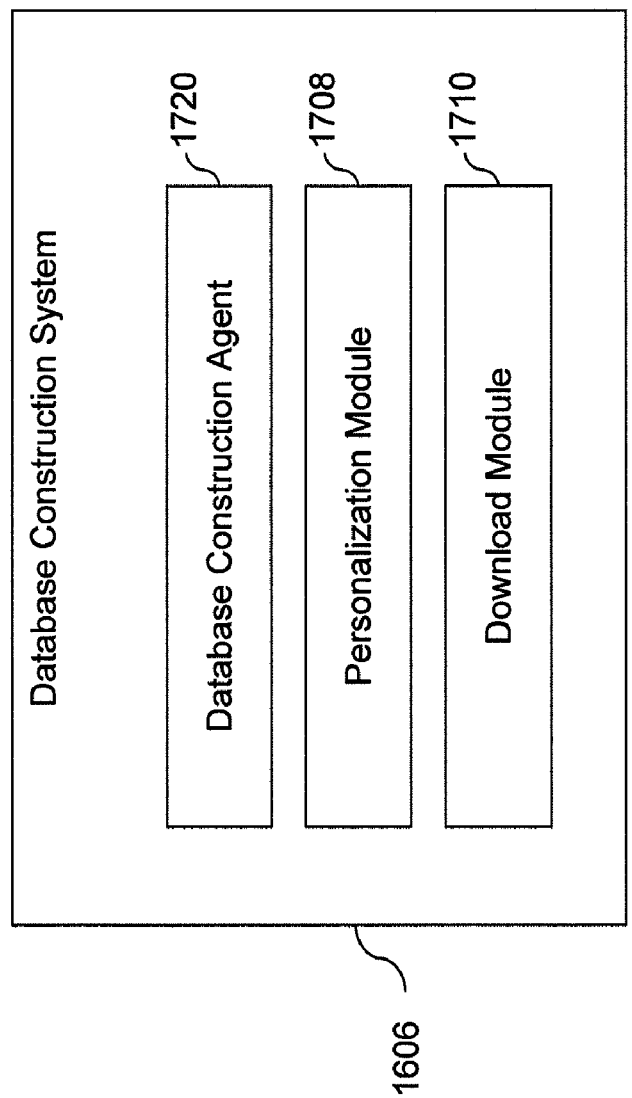
Figure 17B:
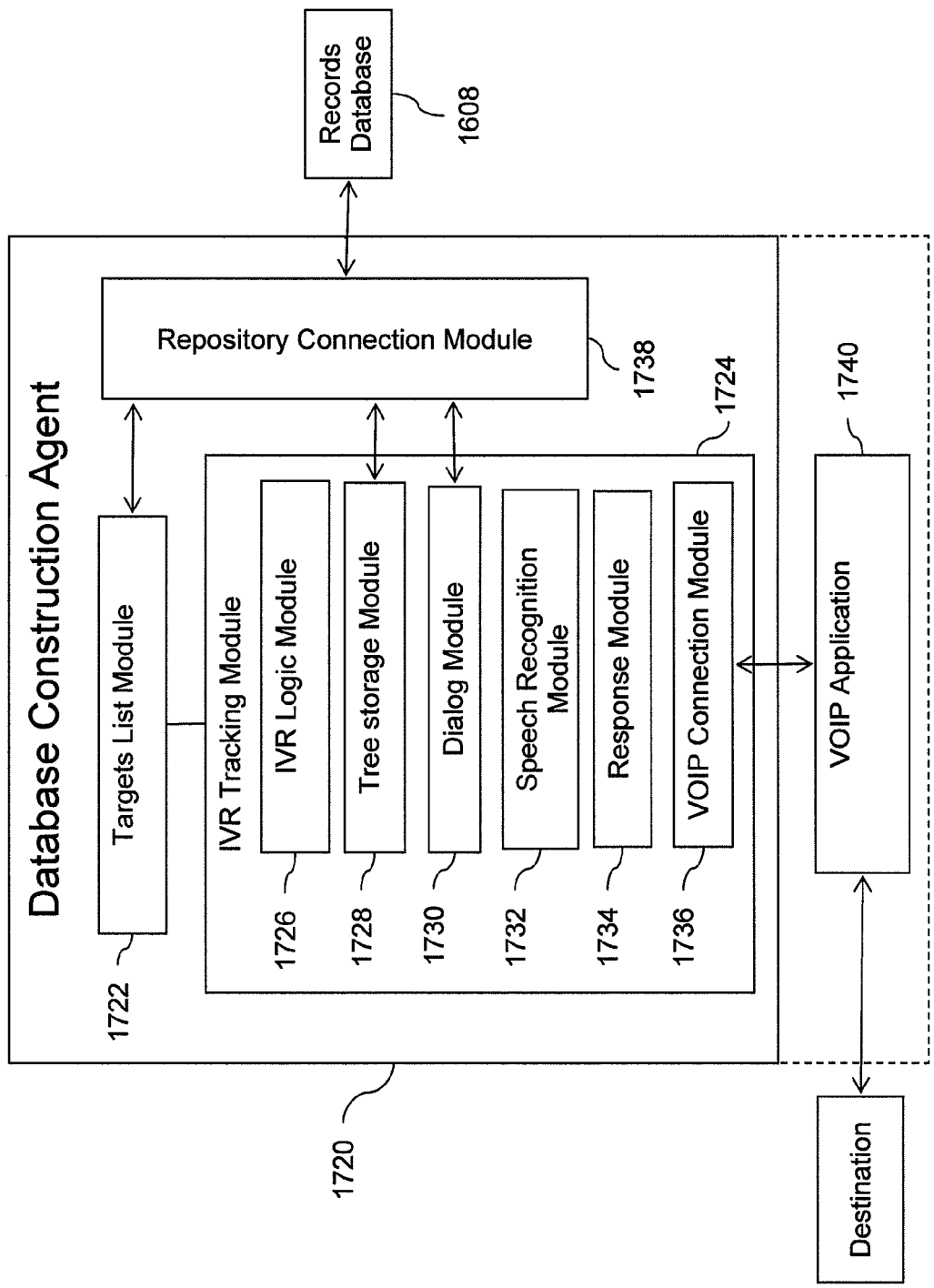
Figure 17C:
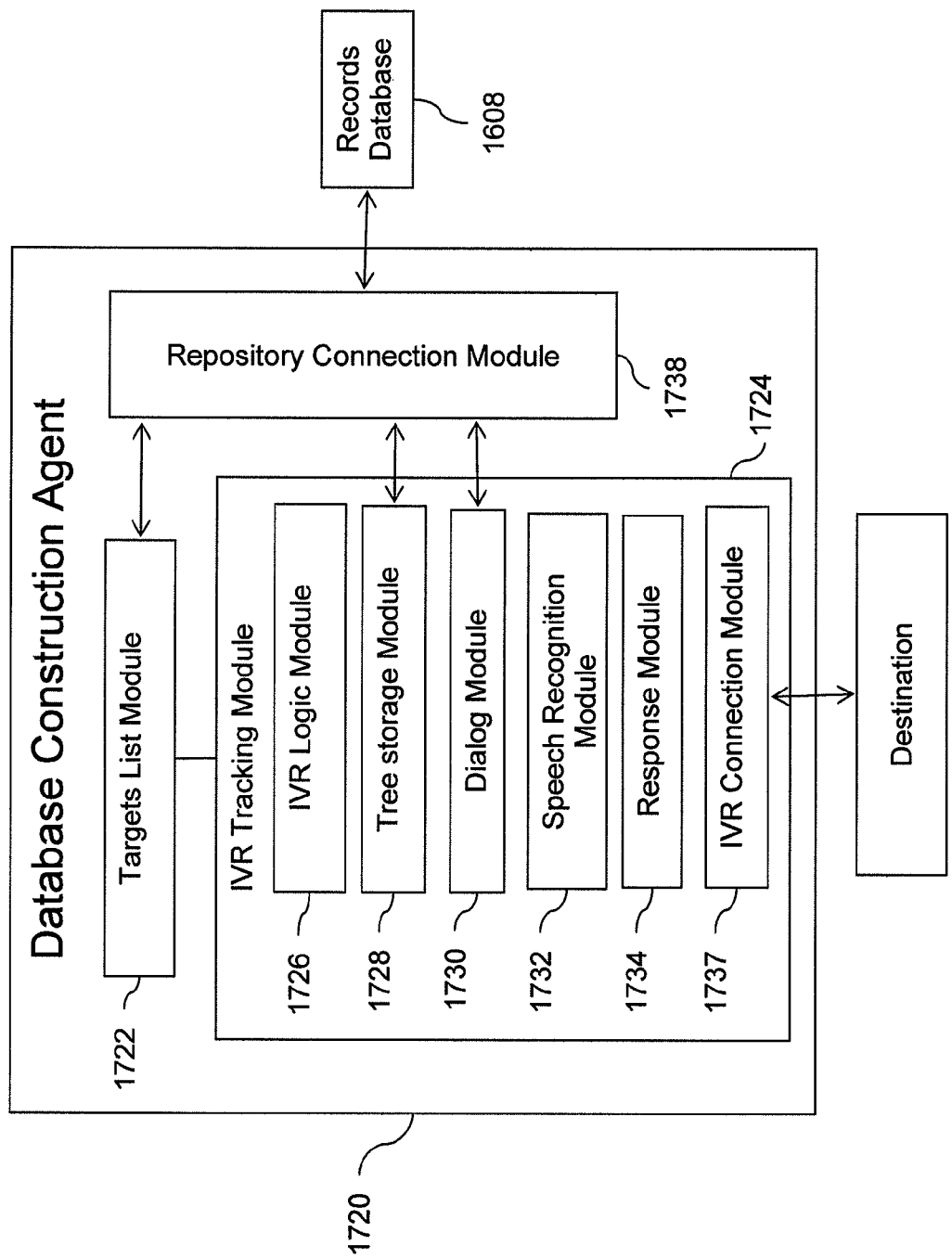
Figure 18:
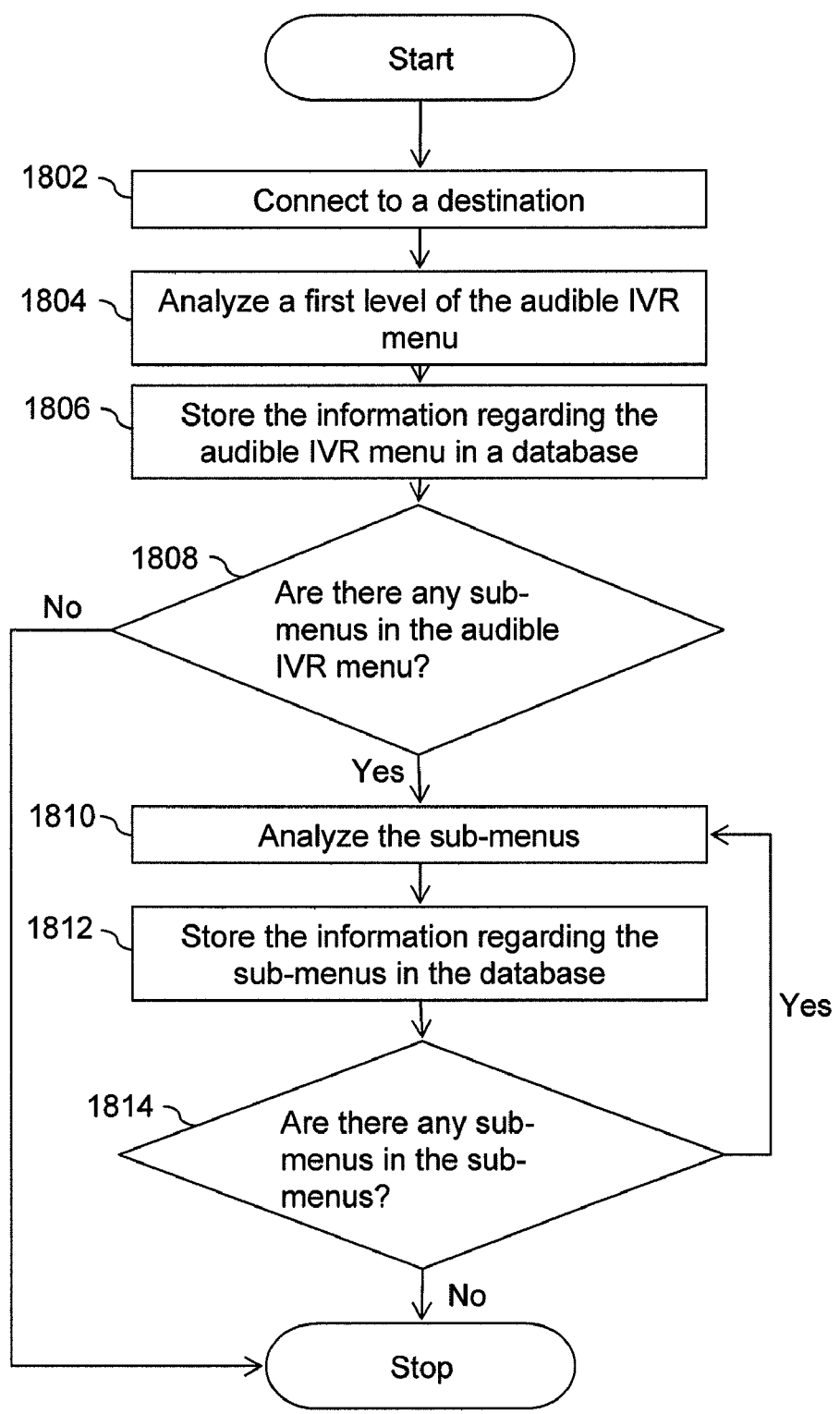
Figure 19:
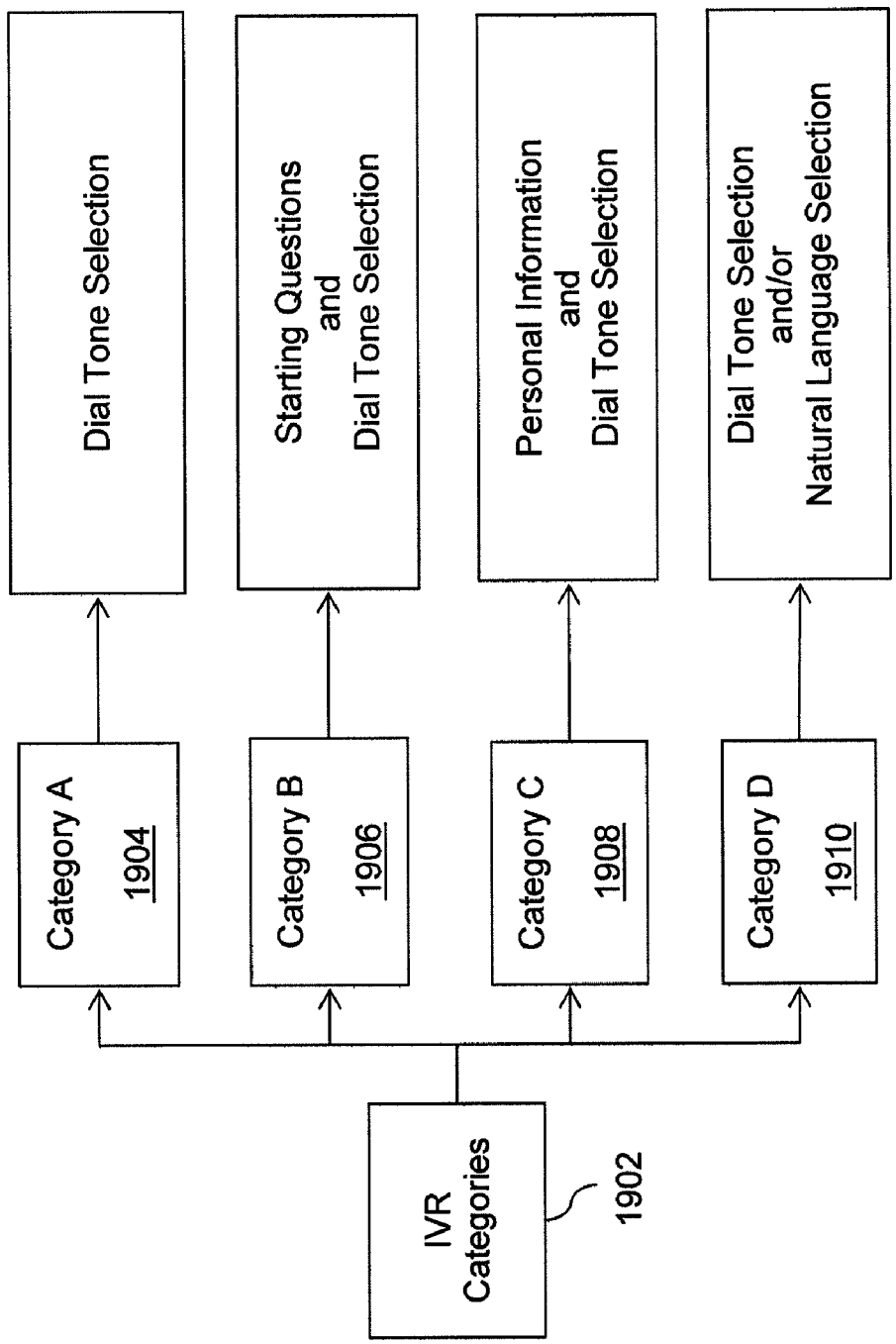
Figure 20A:
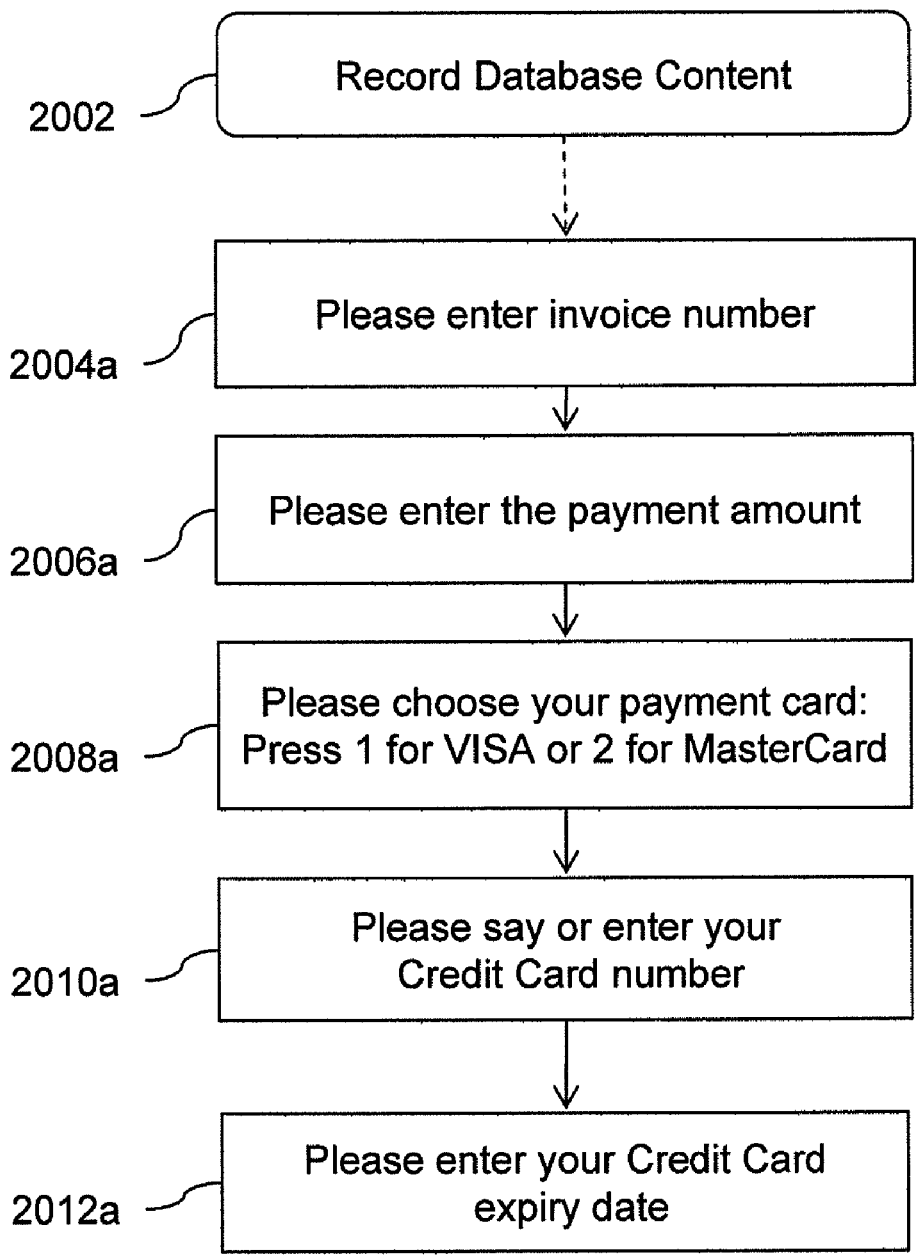
Figure 20B:
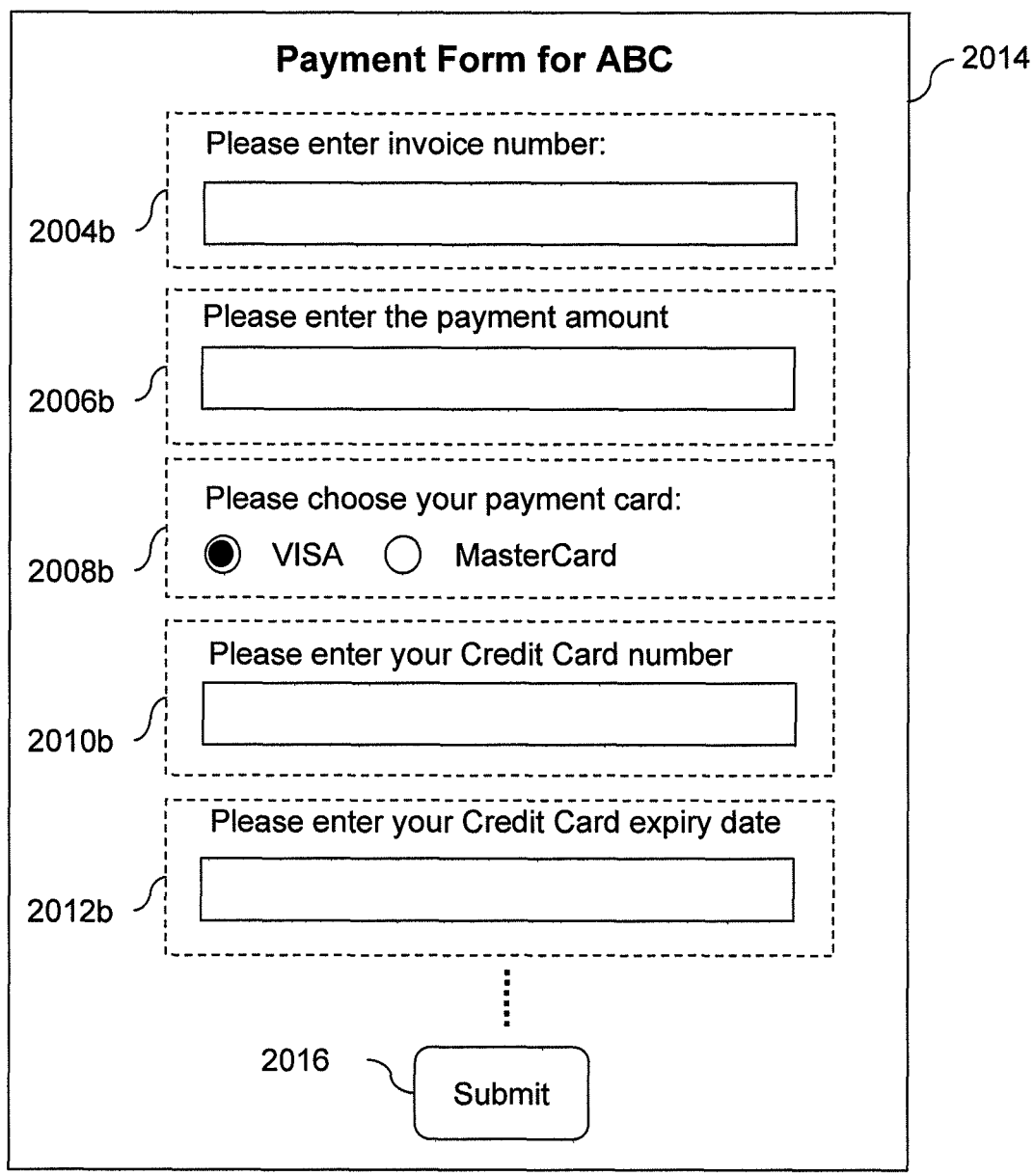

Having thus described the invention in general terms, reference will now be made to the accompanying drawings, which are not necessarily drawn to scale, and wherein:

FIG. 1a illustrates an exemplary environment where various embodiments of the invention function;

FIG. 1b illustrates another exemplary environment where various embodiments of the invention function;

FIG. 1c illustrates yet another exemplary environment where various embodiments of the invention function;

FIG. 2A illustrates an exemplary audible Interactive Voice Response (IVR) menu at a destination;

FIG. 2B illustrates an exemplary visual menu at a device corresponding to the audible IVR menu of the destination;

FIG. 2C illustrate an exemplary visual menu that display graphics for each option;

FIG. 2D illustrate an exemplary tooltip that is displayed when a curser is hovering on an option in the visual menu;

FIG. 3A, 3B illustrates exemplary components of the device for implementing a Visuphone, in accordance with an embodiment of the invention;

FIG. 4 illustrates an exemplary display of the visual menu on the device, in accordance with an embodiment of the invention;

FIG. 5 illustrates exemplary components of the device for implementing the Visuphone, in accordance with another embodiment of the invention;

FIG. 6 illustrates an exemplary display of the visual menu on the device, in accordance with another embodiment of the invention;

FIG. 7 illustrates a webpage displayed on the device that may be used to initiate a connection to the destination, in accordance with an embodiment of the invention;

FIG. 8 illustrates an exemplary software architecture of Visuphone, in accordance with an embodiment of the invention;

FIG. 9 illustrates exemplary components of the Visuphone, in accordance with an embodiment of the invention;

FIG. 10 illustrates an exemplary remote server for storing information required by the Visuphone, in accordance with an embodiment of the invention;

FIG. 11 illustrates presentation of a visual menu in case of call forwarding, in accordance with an embodiment of the invention;

FIG. 12 illustrates the presentation of the visual menu when a phone connection is associated with a wide band internet 'smart' modem;

FIG. 13 illustrates the presentation of the visual menu when a telephone connection is established through an external telephone service by using a computer;

FIGS. 14A, 14B, and 14C illustrate a Visu-add-on that provides the features and functionality of the Visuphone;

FIGS. 15A, 15B, 15C, and 15D illustrate a flowchart diagram for presentation, selection and update of visual menus, in accordance with an embodiment of the invention;

FIG. 16 illustrates exemplary components of a device for implementing a database construction system, in accordance with an embodiment of the invention;

FIGS. 17A, 17B, and 17C illustrate exemplary components of the database construction system, in accordance with an embodiment of the invention;

FIG. 18 illustrates a flowchart diagram for creating a database for visual menus, in accordance with an embodiment of the invention;

FIG. 19 illustrates an exemplary set of IVR categories;

FIG. 20A illustrates an exemplary information process stored in a database;

FIG. 20B illustrates an exemplary web form generated for the information process of FIG. 20A.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1a illustrates an exemplary environment where various embodiments of the invention function. A caller 106 may use a device 102a to connect to destinations 108a-n. Device 102a can be a telecommunication device that can connect directly to a Public Switched Telephone Network (PSTN) 110. A person skilled in the art will appreciate, that device 102a can also connect to a private telephone exchange. Examples of device 102a include, but not limited to, a telephone, a mobile phone, a Smartphone or any other device capable of voice or data communication. When caller 106 dials a phone number and connects to any destination from destinations 108a-n, an audible Interactive Voice Response (IVR) menu may be played to caller 106. Each of destinations 108a-n can have different IVR menus. For example, IVR menus of bank may be completely different from that of a hospital. Typically, the audible IVR menu provided by destinations 108a-n comprises audible options or instructions. Caller 106 may be required to select various options from the audible IVR menu to obtain the required information or service from the dialed destination. Various types of destinations 108a-n that implement the audible IVR menu include, for example, banks, hotels, fast-food outlets, utility services providers, corporate offices and so forth. Device 102a includes a Visuphone 104 that displays a visual menu on device 102a corresponding to the audible IVR menu based on a phone number of the destination to be connected. Visuphone 104 may be hardware, an application stored as software, a firmware on device 102a, or a combination thereof. Thereafter, caller 106 can select the options of the audible IVR menu from the visual display without the requirement to listen to the audible instructions. Exemplary audible IVR menu at destination 108a and a corresponding visual menu are explained in detail in conjunction with FIGS. 2A and 2B.

FIG. 1b illustrates another exemplary environment where various embodiments of the invention function. As shown, device 102b can be a device that can be connected directly to a network 112. Examples of device 102b include, but are not limited to, a personal computer, a laptop, a mobile phone, a smart-phone, a fixed line telephone, Voice Over Internet Protocol (VOIP) phone or other devices capable of voice or data communication. Device 102b may include various applications or computer programs that enable caller 106 to use device 102b for connecting to destinations 108a-n through PSTN 110 over network 112. For example, the applications may be VOIP applications, such as but not limited to, Skype, Magic Jack, Google Talk and so forth. A gateway 116 provides interconnection between PSTN 110 and network 112.

Examples of network 112 include any wired or wireless network, such as but not limited to, a Local Area Network (LAN), a Wide Area Network (WAN), a Wi-fi network and so forth. As discussed with reference to FIG. 1a, destinations 108a-n presents the audible IVR to caller 106. Device 102b includes Visuphone 104b that displays a visual menu on device 102b corresponding to the audible IVR menu based on a phone number of the destination to be connected.

FIG. 1c illustrates yet another exemplary environment where various embodiments of the invention function. As shown, device 102b can be connected to PSTN 110 through network 112 or through the cellular network 111. Various service providers provide multiple or overlapping services to customers. For example, cable television service provider may also provide phone and Internet service, optical Internet provider may also provide phone or television services, WiMax service providers that provide phone service and so forth. Network 112 may be any service provider that provides such services, for example, but not limited to, cell phone services, wireless services, Internet services, cable television services, or various combinations of the above or other type of services. As discussed with reference to FIG. 1a, destinations 108a-n presents the audible IVR to caller 106. Device 102b includes Visuphone 104 that displays a visual menu on device 102b corresponding to the audible IVR menu based on a phone number of the destination to be connected.

With reference to FIG. 2A, an audible IVR menu 222a at destination 108a is illustrated. A person skilled in the art will appreciate that audible IVR menu 222a is an exemplary graphical representation of the audible instructions presented by destination 108a for the sake of explanation and is not an actual graphical display. For explanation, assuming that destination 108a is a pizzeria that provides home delivery and takes away services. Caller 106 connects to destination 108a by dialing a board phone number 202a. Subsequently, various options of audible IVR menu 222a are played to caller 106. The various options include an option 204a that plays an audible instruction, "press 2 for pizza order", an option 206a that plays an audible instruction, "press 3 for order status", an option 220a that plays an audible instruction, "press 0 for main menu". Caller 106 can select an option by pressing from device 102, a button corresponding to the instructions in the audible IVR menu. Subsequently, the selected options are transmitted to the destination and the menu is advanced if there are any further options. Alternatively the display can present the next layer of menu options to give the user better view of the option domain and allow even faster interface between user and the IVR.

For example, selection of option 204a presents an option 208a that plays an audible instruction, "press 1 for veg" and an option 210a that plays an audible instruction, "press 2 for non-veg" is played. Similarly, selecting option 208a or 210a presents or option 214a that plays an audible instruction, "press 1 for home delivery", an option 216a that plays an audible instruction, "press 2 for take away". Similarly, selection of option 206a presents an option 212a that plays an audible instruction, "press 1 to talk to an executive".

Options 204a, 206a, 208a, 210a, 212a, 214a, and 216a are part of a main menu 218a. Main menu 218a can be repeated by selecting option 220a by caller 106. Caller 106 may repeat main menu 218a for example, in case of a mistake in selection. Therefore, caller 106 directly interacting with audible IVR menu 222a may be required to listen to all or various audible options before executing a desired action. However, the interaction is simplified by Visuphone 104, that presents a visual menu 222b to caller 106 corresponding to audible IVR menu 222a, as explained with reference to FIG. 2B.

As shown in FIG. 2B, visual menu 222b is displayed on a screen of device 102b that may connects to destination 108a through network 112 and the PSTN 110. Visual menu 222b can be displayed before a connection is established with destination 108a. A person skilled in the art will appreciate that device 102b is illustrated for the sake of explanation, and similar visual menu 222b can be displayed on device 102a that connects to destination 108a directly through PSTN 110. Visual menu 222b includes various nodes corresponding to the options of an audible IVR menu of destination 108a. The various nodes of visual menu 222b include a node 202b for connecting to board number 202a of destination 108a. Similarly, nodes 204b, 206b, 208b, 210b, 212b, 216b corresponds to option 204a, 206a, 208a, 210a, 212a, 216a respectively. A node corresponding to option 220a may not be required in visual menu 222b, as the complete menu is visible and caller 106 may not be required to repeat audible IVR menu 222a. Therefore, when caller 106 selects a node from visual menu 222b, Visuphone 104 automatically transmits the desired action corresponding to the options in audible IVR menu 222a to destination 108a. For example, assuming that caller 106 calls destination 108a to order a veg pizza for home delivery. In this case, caller 106 directly selects nodes 208b and 214b from a touch screen of device 102a, corresponding to veg pizza and home delivery from visual menu 222b. Alternatively, caller 106 directly selects nodes 204b, 208b and 214b by pressing corresponding keys '2', '1', and '1', from a keypad or screen of device 102a without a need to listen to the complete audible IVR menu. Visuphone 104 accordingly transmits the signals to audible IVR menu 222a. In this case, the signals required by audible IVR menu 222a may be the Dual Tone Multi-Frequency (DTMF) tones of '2', '2', and '1' for options 204a, 208a, and 214a. Moreover, caller 106 may not be required to select all the options. For example, when caller 106 wants to order a veg-pizza for take away. Then, only the nodes 208b and 216b may be required to be selected, and node 204b is automatically understood by Visuphone 104b. Furthermore, a node that is necessary for a transaction is automatically highlighted. For example, if caller 106 only selects node 216b for take away, then node 208b for a veg-pizza or node 210b for non-veg are highlighted for selection. In an embodiment of the invention, caller 106 may select nodes irrespective of the sequence presented in the audible IVR menu. For example, node 214b for home delivery may be selected before node 208b of veg-pizza. Visuphone 104 automatically generates a sequence of the selections made by caller 106 and transmits it to the destination. Furthermore, Visuphone 104 stores the selections and the numbers dialed by the caller during the call in association with the destination number. The Visuphone may enable callers to search or bookmark options in a menu with a large number of options. For example, callers can search for a node 214b from the menu by typing 'home delivery'. As a result, navigation of a complete visual menu may not be required.

In an embodiment of the invention, visual menu 222b is displayed to caller 106 when a call is received at device 102. For example, a service provider may call to provide information about new services or account of caller 106. Further, caller 106 may be required to select various options based on his preferences. Visuphone 104b may detect the received number and correspondingly display a visual menu to the caller.

FIG. 2C illustrates a visual menu 222c with added graphics for the nodes. It is well known that graphics are easier to learn and are faster to recognize than words. Therefore, graphics are used in various computerized device interfaces. The exemplary graphics as shown with reference to FIG. 2C are icons. Various other types of graphics can be displayed for example, animated icons, icons that highlight or animate when the node is highlighted, and so forth.

The graphics may be displayed for each node or a few nodes based on the usability of visual menu 222c. For example, for the node 208 can icon of a vegetable may be displayed to designate a vegetarian pizza, and for the node 214c of home delivery, an icon of house may be displayed. In an embodiment of the invention, visual menu 222c can be customized to display only the text, only the icons or both. Furthermore, caller 106 can suggest or use various icons based on his preferences.

FIG. 2D illustrate an exemplary tooltip that is displayed when a curser is hovered over an option in the visual menu. As shown, a tooltip box 222 is displayed when a cursor 226 is hovered on option 204c or 206c. Similarly, a tooltip box 224 may be displayed containing the next menu text with or without it's available options 210c, 208c in case the user decides to select the option over which cursor 226 is hovered, for example option 204c.

In an embodiment of the invention, Visuphone 104b may provide a standard menu per group of similar audible IVR or destinations. With reference to FIG. 2B an example of a menu at a pizza provider is discussed. Generally, every pizza provider may have its specific audible IVR menu. However, caller 106 may prefer to use a single standard visual menu for all pizza providers. Therefore, learning a single visual menu will be useful for engaging various providers. In such a case, the database may include a standard menu per class of compatible providers. Visuphone 104b may offer caller 106 an option to use the standard domain menu. Therefore, when caller 106 makes a selection on the standard menu, Visuphone 104 may translate the selection to the specific audible IVR menu selection and send the proper dialing tones to that specific audible IVR. Furthermore, the standard menus may be published. Therefore, various providers may modify their own menus to help their customers. Additional aspect of the standard menu is the use of icons as discussed with reference to FIG. 2C. The icons may represent standard choice across various domains. For example, if a specific icon may represent sales, then the same icon may be used for sales of airlines tickets when the destination is an airline company or sales of telephone service when the destination is a telephone company. In an embodiment of the invention, the caller may customize the icons or graphics displayed on the menu.

FIG. 3 illustrates exemplary components of device 102a for implementing Visuphone. Device 102a includes a system bus 324 to connect the various components. Examples of system bus 324 include several types of bus structures including a memory bus or memory controller, a peripheral bus, or a local bus using any of a variety of bus architectures. As discussed with reference to FIG. 1a, device 102a can be a device such as computer, a smart-phone and so forth. Device 102a can connect to PSTN 110 through a gateway 324, which is connected to network 112 through a network interface 314. Input/Output (IO) interface 316 of device 102a may be configured to connect external or peripheral devices such as a memory card 318, a keyboard and a mouse 320 and a Universal Serial Bus (USB) device 322. Although not shown, various other devices can be connected through IO interface 316 to device 102a. In an embodiment of the invention, device 102a may be connected to a hub that provides various services such as voice communication, Internet access, television services and so forth. For example, the hub may be a Home Gateway device that acts as a hub between the home environment and the Broadband Network.

Device 102a includes a display 302 to output graphical information to caller 106. In an embodiment of the invention, display 302 may includes a touch sensitive screen. Therefore, caller 106 can provide inputs to device 102a by touching display 302 or by point and click using the 'mouse'. Memory 306 of device 102a stores various programs, data and/or instructions that can be executed by Central Processing Unit (CPU) 304. Examples of memory include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by device 102a. Memory 306 may include Operating System (OS) (not shown) for device 102a to function. Further, memory 306 may include other applications 310 that enable the caller to communication with destinations. Examples of other applications 310 include, but are not limited to, Skype, Google Talk, Magic Jack, and so forth. Other applications 310 may be stored as software or firmware on device 102a. Further, memory 306 includes Visuphone 104 for presenting a visual menu corresponding to the audible IVR menu of destination as discussed with reference to FIGS. 2A, 2B and 2C. Visuphone may be an application stored as a software or firmware on device 102a. The visual menus are stored in a visual menu database 308 in memory 306 of device 102a. Visuphone 104 searches visual menu database 308 for visual menus corresponding a phone number of destinations 108a-n dialed by caller 106. Further, Visuphone 104 searches visual menu database 308 for visual menus corresponding a phone number of a call received from a destination to caller 106. Subsequently, if the visual menu for the phone number is available in the database, then the visual menu is displayed on display 302. Further, Visuphone 104 may be implemented as a plug-in to other applications 310. Therefore, when a phone number is dialed from other applications 310, Visuphone 104 detects the dialing of the number and automatically displays the visual menu corresponding to the phone number. Thereafter, the caller can interact with the visual menu, without listening to the complete audible IVR menu of destinations.

With reference to FIG. 4, an exemplary display of a visual menu 406 on device 102c is illustrated. The caller may dial a phone number 402 corresponding to a destination using keypad 320. Keypad 320 may be a physical keypad or a virtual keypad displayed on a touch screen display 412. Subsequently, visual menu 406 corresponding to phone number 402 is searched and displayed on display 412.

In an exemplary instance, if caller dials a phone number of an IVR destination, then a visual menu corresponding to audible IVR menu of the destination is displayed on display 412. Similarly, if the caller receives a call from a phone number of destination, then a visual menu corresponding to audible IVR menu of destination is displayed on display 412. Thereafter, caller can interact with the visual menu to select options from the audible IVR menu. Visual menu 406 may be displayed before actual connection of device 102c to destinations. Therefore, caller can select a desired action from visual menu 406 before connecting to destinations. In an embodiment of the invention, visual menu 406 may be provided in real-time to caller. In an embodiment of the invention, visual menu 406 is provided a messaging service such as a Short Messaging Service (SMS). Therefore, destinations may provide customized visual menu 406 to caller 106. Visual menu 406 may be customized based on the profile of caller. In an embodiment of the invention, the profile may be generated based on access pattern of caller or the data capture by a hub connected to device 102c.

Caller can interact with visual menu 406 by pressing a desired button from keypad 320. For example, caller can press a '5' key from keypad 320 to select a node 5 in visual menu 406. Further, caller can directly select the node 5 of visual menu 406 from display 412, in case of a touch sensitive screen. Depending on the complexity or size of destinations, visual menu 406 may have various nodes. Moreover, display area of display 412 may be limited or small. As a result, all the nodes of visual menu 406 may not be displayed together on display 412. In such a case, Visuphone is configured to allow caller to navigate by scrolling horizontally and/or vertically to view nodes on visual menu 406. Further, Visuphone may detect the capability of device 102a before displaying the visual menu. For example, in case device 102a is a basic mobile phone with limited functionality of the display screen. Therefore, Visuphone may display the visual menu in form of a simple list. Similarly, a list may be displayed in case of fixed line telephones. Moreover, in case device 102c includes a high capability screen, such as but not limited to an iPhone, then the visual menu is displayed in form of graphics.

Subsequently, after caller selects a desired action from visual menu 406, a connection is established between device 102c and destinations based on the selected option. In one embodiment, Visuphone is configured to detect and present an application or computer program available on device 102c.

Visuphone can be further configured to display an advertisement 408. Advertisement 408 may correspond to the type of services provided by the dialed destinations. For example, if destination dialed is a pizzeria, then advertisement 408 may include promotions or offers about a new pizza. Moreover, advertisement 408 may include promotions or offers from a third party or a competitor of the destination. Further, Visuphone may be coupled to an advertising database. The advertising database may include advertisements related to the phone numbers of the destinations. The advertising database may be stored at device 102c, the destinations, service providers or other third party servers. Further, the advertisements may be provided based on a profile of caller. For example, assuming that the caller calls a bank holding his saving account. Therefore, the advertisement displayed to the caller may be based on the location, address, account balance, type and volume of transactions, loans, purchases and so forth.

Visuphone may be configured to connect to an intended destination, when caller selects advertisement 408. Further, Visuphone displays visual menu 406 of the intended destination. In an embodiment, Visuphone stores the interactions of caller with visual menus. For example, Visuphone may automatically learn the numbers dialed or options selected from the menu. Moreover, the learned numbers or choices are associated with the dialed phone number of the destination. Therefore, the caller is assisted in his future calls. For example, when caller calls the destination again, then the actions that were performed in the last interaction are presented prominently to caller; or a previous sequence may be automatically performed. Further, the actions that are frequently performed are presented prominently to caller. For example, if caller dials a bank frequently to enquire about his account balance, then the options for selecting his account balance may be highlighted.

FIG. 5 illustrates exemplary components of device 102b for implementing Visuphone, in accordance with another embodiment of the invention. Device 102b includes a system bus 526 to connect the various components. Examples of system bus 526 include several types of bus structures such as, but not limited to, a memory bus or memory controller, a peripheral bus, or a local bus using any of a variety of bus architectures. As discussed with reference to FIG. 1b, device 102b can be a computing device such as, but not limited to, a personal computer, a laptop, a mobile phone, a smart-phone, and so forth. Device 102b can connect to network 112 through a network interface 514. Further, device 102b can connect to PSTN 110 through gateway 116 and network 112 through network interface 514. Input/Output (IO) interface 516 of device 102b may be configured to connect external or peripheral devices such as a mouse 518, a keyboard 520, a speaker 522, microphone 523 and a camera 524. Although not shown, various other devices such as hard disk, a Universal Serial Bus (USB) device or others can be connected through IO interface 516 to device 102b. A person skilled the art will appreciate that although not described, various other types of devices capable of voice and/or data communication can be connected to device 102b.

Device 102b includes a display interface 502 to connect to a display 512. Display interface 502 can be for example, a video adapter. Display 512 outputs graphical information to caller. In an embodiment of the invention, display 512 includes a touch sensitive screen. Therefore, caller 106 can provide inputs to device 102b by touching display 512 or by pointing with the mouse and click. Memory 506 of device 102b stores various programs, data and/or instructions that can be executed by Central Processing Unit (CPU) 504. Examples of memory include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by device 102b. Memory 506 may include Operating System (OS) (not shown) for device 102b to function. Further, memory 506 may include other applications 510 that enable caller 106 to communication with destinations 108a-n. Examples of other applications 510 include, but are not limited to, Skype, Google Talk, Magic Jack, and so forth. Other applications 510 may be stored as software or firmware on device 102b. Further, memory 506 includes Visuphone 104 for searching and presenting a visual menu corresponding to the audible IVR menu of a destination as discussed with reference to FIGS. 2A and 2B. Visuphone 104 may be an application stored as a software or firmware on device 102b. The visual menus are stored in visual menu database 308 in memory 506 of device 102b. Visuphone 104 searches visual menu database 308 for visual menu corresponding a phone number of a destination dialed by caller. Subsequently, the visual menu is presented on display 512 for selection of options by caller. Further, Visuphone 104 may be implemented as plug-in to other applications 510. Therefore, when a phone number is dialed from other applications 510, Visuphone 104 detects the dialing and automatically searches and displays the visual menu corresponding to the dialed phone number. Thereafter, caller can interact with the visual menu, without listening to the audible IVR menu of destinations.

With reference to FIG. 6, an exemplary display of a visual menu 604 on device 102b is illustrated. Caller may dial a phone number 610 from a VOIP application 608 on device 102b. Phone number 610 may correspond to any of destinations. In an embodiment, caller selects a pre-stored phone number from the application 608. Subsequently, visual menu 604 corresponding to a dialed destination is displayed on display 512. In an embodiment, display 512 may comprises a touch sensitive screen. Therefore, caller can interact with device 102b directly through display 512.

In an exemplary instance, if caller 106 dials a phone number of destination, then a visual menu corresponding to audible IVR menu of destination is displayed. Thereafter, caller can interact with the visual menu to select options and to transmit inputs for the audible IVR menu of the corresponding destination. Visual menu 604 could be displayed before actual connection of device 102b to destinations. Therefore, caller 106 can select a desired option from visual menu 604 before establishing a connection to the destination. Depending on the complexity or size of the destinations, visual menu 604 may have various nodes. For example, an organization with 50 departments may have more menu options or nodes than that of an organization with 10 departments. Further, the display area of display 512 may be limited. As a result, all the nodes of visual menu 604 may not be displayed together on display 512. In such a case, Visuphone 104 is configured to allow caller 106 to navigate by scrolling horizontally and/or vertically to view nodes on visual menu 604. Moreover, caller 106 can search for a desired option from the visual menu.

Subsequently, after caller 106 selects a desired option from visual menu 604, a connection is established between device 102b and a destination based on the selected action. In one embodiment, Visuphone is configured to detect and present applications suitable to caller for initiating the connection. For example, Visuphone may detect more than one VOIP applications present in device 102b and present them to caller 106 on display 512. Thereafter, caller can select an application to be used or initiate the connection in a default configuration. The default configuration can be for example, VOIP application 608 on which phone number 610 was dialed. In another embodiment, caller 610 may select a phone number displayed in applications such as a browser, messenger, or a mail client. Subsequently, Visuphone detects and presents applications suitable to caller for initiating the connection. Furthermore, Visuphone is configured to display visual menu 604 for the phone number selected from the applications.

Visuphone is further configured to display an advertisement 606. Advertisement 606 may correspond to the type of services provided by destinations. For example, if the destination is a bank, then advertisement 606 may include promotions or offers about new loans or schemes. Moreover, advertisement 606 may include promotions or offers from a third party or a competitor of destination. Visuphone may be configured to connect to intended destination, when caller selects advertisement 606. Further, Visuphone displays visual menu 606 of the intended destination. In an embodiment, Visuphone stores the interactions of caller with visual menus after a call to an IVR was made. Therefore, when caller calls the same destination again, then the options that were selected in the last interaction are presented prominently. Further, the options that are frequently selected can be presented prominently. For example, if caller dials a bank frequently to check his account balance, then the options for selecting his account balance may be highlighted. Additionally the information such his account number can be brought up to save effort for the user who can than just OK for that 'auto fill' to be dialed out to the IVR at the proper time.

With reference to FIG. 7, device 102b may include a web browser 702 to display web pages from the Internet and/or other computer networks. Various websites provide a phone number on the web pages as a click-to-talk button. The clickable button can provide, for example, a contact number of executives of the organization. The clickable button may be programmed to display a phone number of the organization and/or display a caller a form to provide his contact details, so that an executive from the organization can call back the caller. Visuphone is configured to detect a connect 706 button on a webpage 704. Connect 706 may be used by Visuphone to initiate a connection to a destination.

Visuphone detects and launches a VOIP application on device 102b. In an embodiment, in case more than one application is available on device 102, Visuphone selects a VOIP application preferred by caller. Moreover, Visuphone 104 may be configured to automatically login into the VOIP application. In an embodiment, caller 106 stores the login details for the VOIP application in Visuphone. Further, Visuphone displays a visual menu corresponding to audible IVR menu of the destination connected once click on the connect 706 tab. Therefore, caller can connect to the destination from web browser 702 automatically and may not be required to dial the phone number or provide a call-back information.

In an embodiment of the invention, Visuphone 104 may include a VOIP plug-in that monitors the outgoing calls made from the VOIP application. Therefore, the VOIP plug-in may search each dialed number in visual menu database 308. In case, the dialed number is found in visual menu database 308 and is associated with an IVR, then the VOIP plug-in may display the visual menu corresponding to the audible IVR menu of the dialed number.

Another embodiment of the invention allows the user to select the visual menu using car display like GPS display. Hands-free cell phone system is used in many cars as a separated device or as an integrated system in the car. These devices allow the user to talk with the cell phone without holding the cell phone in his hands. Some devices are using the car speakers for the phone call. In many cases, the hands-free system can use a display screen in the car like GPS screen or other display. Following voice menu while driving might not be the optimal way to use hands-free cell phone system. In some cases, selecting an option from a visual menu is preferred. While driving or stopping in red light, it might be easier to use larger display like the GPS display in the car. The display can present the visual menu and the user can select the option from the menu. The computing engine to support the visual menu could be embedded in the car GPS system or in another controller that have access to the car display. Once the system recognize a destination of a call to be an IVR it will access the database pull out the menu and display. Accordingly all the other Visuphone features could be incorporated.

FIG. 8 illustrates exemplary software architecture 800 of Visuphone 104, in accordance with an embodiment of the invention. Hardware layer 802 includes various hardware of device. For example, but not limited to, a mouse, a keyboard, a speaker, a microphone, a camera, a USB device, a display and so forth. The drivers required for the hardware of device are provided by drivers layer 804. Moreover, drivers layer 802 interfaces with Operating System 806.

Operating System 806 provides memory and environment required by Visuphone 104 and other applications 808 for functioning on device. Examples of Operating System 806 include, but are not limited to, Windows, Macintosh, Linux, Symbian, Android and so forth. Visuphone 104 may be implemented as a plug-in to other applications 808, such as Skype, Google Talk, web browser, mail client, and so forth. In an embodiment, Visuphone 104 may be implemented as a standalone application on device. Further, Visuphone 104 may be configured to execute as a background application. Therefore, caller may not be required to specifically launch Visuphone 104. Furthermore, Visuphone 104 may be implemented as a multi-threaded application. Therefore, visual menus of more than one destination may be displayed simultaneously on device.

FIG. 9 illustrates exemplary components of Visuphone 104, in accordance with an embodiment of the invention. As discussed above, Visuphone 104 may be implemented as hardware, software, or firmware on a device. Further, Visuphone 104 may be configured to execute as a background process on device. In an embodiment, Visuphone 104 may be configured to execute as a system service. Therefore, other processes or applications executing on the device may not block the operation of Visuphone 104.

When caller dials, selects or receives a phone number on the device, a detection module 902 of Visuphone 104 detects that a phone number has been dialed, selected or received. For example, detection module 902 may detect key presses or caller ID on device. Caller may use a VOIP application on device for dialing the phone number. Moreover, caller may use a mouse to a joystick to select or press icons of numbers displayed on the VOIP application. Further, detection module 902 is configured to identify the VOIP applications available on device and used by caller. Moreover, detection module 902 may detect the position co-ordinates of the VOIP application on a display of device. For example, in case device includes the Microsoft Windows OS, then the position co-ordinates of the VOIP application can be detected from the registry of the OS. Detection module 902 may be configured to store the position of number icons relative to position co-ordinates of various VOIP applications. Therefore, based on the co-ordinates of the position of the VOIP application, detection module 902 can detect the exact position of each number icon on the display of device. For example, if the co-ordinates of a top-left edge of the VOIP application is (X,Y) on the display, and the co-ordinates of an icon for number '1' on VOIP application is (X1,Y1) relative to its top-left edge, then the exact co-ordinates of the icon for number '1' may be calculated as (X+X1, Y+Y1) on the display. A person skilled in the art will appreciate that other types of mathematical operations can be applied to calculate the co-ordinates of the icons on the display of the device.

Detection module 902 may be configured to detect the co-ordinates of the cursor on the display of device. Further, detection module may be configured to detect the action events generated by the mouse or joystick, such as a click, a double-click, drag, select, scroll and so forth. Therefore, when caller selects or press a number on the VOIP application, detection module 902 may detect the number from the position of the cursor, the VOIP application and the number icon. In an embodiment, detection module 902 may be configured to store the last used co-ordinates of the VOIP application and number icons. Therefore, detection and/or calculation of the co-ordinates may not be required. Furthermore, detection module 902 may be configured to detect a connect button displayed on a web page of a browser on device as explained with reference to FIG. 7. Therefore, when caller clicks the connect button, detection module 902 identifies the phone number behind the connect button. In an embodiment, detection module 902 detects the connect button and the associated phone number by scanning the source code of the web page.

The phone number detected by detection module 902 is used by a search module 904 of Visuphone. In an embodiment, detection module 902 may be configured to transfer each digit to search module 904 in real-time as clicked by caller. Search module 904 searches visual menu database for visual menu corresponding to the phone number. An exemplary visual menu is as explained above in conjunction with FIGS. 2B and 2C. As discussed above, visual menu database stores visual menus corresponding to the audible IVR menus of destinations. Moreover, visual menu database may store other information, which is explained in conjunction with FIG. 10. Search module 904 may also be configured to search for other information in visual menu database. In an embodiment, search module searches visual menu database in real-time based on the digits received from detection module 902. Therefore, a visual menu may be identified based on the best match of the number formed by the received digits in visual menu database. As a result, caller may not be required to dial, click, press or select the complete number, which may be convenient and time saving.

The visual menu identified by a search module 904 is displayed on the display of device by display module 906 of Visuphone 104. Display module 906 identifies the position on the display where the visual menu is to be displayed. In an embodiment, the visual menu is displayed such that there is minimum overlap with the VOIP application from which the phone number was dialed or selected. Moreover, display module 906 identifies the size of the visual menu for display based on the characteristics of the display screen of device. Examples of characteristics of the display screen include, but are not limited to, a screen size, resolution, and so forth. Furthermore, in case the visual menu is not completely displayed on the display, then display module 906 may allow caller to navigate the visual menu by scrolling. Moreover, display module 906 may be configured to display other information received from search module 904.

Caller may interact with the visual menu or other information displayed on device. For example, caller may scroll through the visual menu, or select a node from the visual menu. Therefore, when caller selects a node from the visual menu, detection module 902 detects the selected node and communicates the selection to a connection module 908. Thereafter, connection module 908 may establish a connection between device and a destination based on the nodes selected by caller. Connection module 908 may be configured to detect communication systems available in device. For example, in a case, device is a phone not connected to the Internet, connection module 908 may detect that only a radio connection can be made. Otherwise, a most suitable or a connection preferred by caller can be made. In an embodiment, connection module 908 may allow caller 106 to select a VOIP application to establish the connection. In another embodiment, communication module 908 may launch a default VOIP application on the device 102. In yet another embodiment of the invention, connection module 908 can use a VOIP protocol stack defined by Visuphone to establish the connection.

Sometimes, a call of caller may be transferred from one point in the organization to another point within the same organization or to a completely different organization. For example, the call of caller with destination 108a may be transferred to destination 108b. However, destinations 108a and 108b may have different audible IVR menus. Connection module 908 is configured identify the transfer of call and to switch the visual menu of destination 108a with destination 108b. The switching of visual menus is explained in detail in conjunction with FIG. 11.

Some organizations such as banks may require caller to present a voice input for the purpose of authentication. For example, caller may be required to voice out his name or an answer to a security question specified by caller to the bank. Furthermore, voice input may be required to accept or decline a transaction. Caller may record and store the voice responses for such authentications or questions alternatively the system can use synthesis voice. Therefore, when connection module 908 detects that a voice authentication is required, and then voice module 910 is used. Voice module 910 provides voice inputs on behalf of caller by using the responses recorded by caller. Subsequently, the connection or the transaction can be processed.

As discussed in conjunction with FIGS. 4 and 6, Visuphone 104 may be configured to display advertisements on device 102. The advertisements are managed by advertisement module 912 of Visuphone 104. The advertisement may be selected based on the type of destinations. For example, when a dialed destination is a bank, then an advertisement related to banking may be displayed. Moreover, the advertisement can be related a third-party dealing in the same business or professional area or a competitor of the dialed destination. The displayed advertisement may be a text, audio, image or video. In one embodiment, advertisement module 912 may display the advertisements based on the connection bandwidth available at device 102. In another embodiment, advertisement module 912 may display the advertisements based on the pre-set preferences by caller. In one embodiment, advertisement module 912 may be configured to receive the advertisements directly from the dialed destination. In another embodiment, advertisement module 912 may be configured to receive the advertisements from a remote server on a network. The remote server is explained in detail in conjunction with FIG. 10. A selection or click by caller on advertisements may be detected by detection module 902 to display a visual menu of the destination for which the advertisement was displayed.

In some cases, the audible IVR menu of destination may change. For example, the extension numbers of agents in banks may be changed due to addition of new agents. A person skilled in the art will appreciate that there can be other reasons for the audible IVR menu of a destination to be edited, amended or updated. Further, new organizations may be available that use audible IVR menus. The visual menus for these new organizations may not be available in visual menu database stored on device. Therefore, visual menu database may be required to be updated. In an embodiment, Visuphone may be updated to provide additional functionalities to caller. Update module 914 may be configured to update the visual menus stored in visual menu database of device. Moreover, update module 914 may be configured to update Visuphone. Update module 914 may receive the updated visual menus from the remote server on the network. The remote server is explained in detail in conjunction with FIG. 10.

Visuphone may record the caller's selections or keystrokes for audible IVR menus by using customization module 916. The keystrokes may be some personal data of the caller such as his account number, customer number, and so forth. Visuphone can provide better support to caller by presenting the recorded keystrokes so that the caller can approve and sending them without entering them every time. Customization module 916 personalizes the generic visual menu by associating the keystrokes with it and storing in visual menu database 308. Alternatively, an additional set of standard may be defined for representing caller data. In this case, only the code indicating the type of required data is added to visual menu database 308. Visuphonecan than build a relatively small table in visual menu database 308, with the various personal data codes and the actual caller data as analyzed from the caller's keystrokes during his connection with destinations of the audible IVR menus.

FIG. 10 illustrates an exemplary remote server 1002 connected to a remote repository 1004. As shown remote server 2002 is connected to device 102 through a computer network 1006. Further, remote server 1002 can be connected to destinations 108a-n through network 1006, a gateway 1008, and a PSTN 1010. A person skilled in the art will appreciate that device 102 can connect to destinations 108a-n directly through PSTN 1010, therefore the connection is not limited to network 1006. Each of destinations 108a-n may be connected to audible IVR menu repository 1012a-n, here after referred to as destination repository 1012a-n.

Further, device 102 includes visual menu database 308. As discussed above, visual menu database 308 includes visual menus corresponding to audible IVR menus of destinations 108a-n. Moreover, visual menu database 308 may store other information such as profile of caller, voice response of caller, login details for a VOIP application, preferences of caller, ratings for visual menus, identity of visual menus and so forth. As discussed in conjunction with FIG. 9, Visuphone, the visual menus or other information stored in visual menu database 308 may require to be updated. In an embodiment, visual menu database 308 is updated by information received from remote repository 1004. In another embodiment of the invention, visual menu database 308 may be updated by receiving menus through Short Messaging Service (SMS). The SMS may be sent from destination 108a-n or remote repository 1004 to device 102. Remote repository 1004 includes visual menus corresponding to audible IVR menus of destinations 108a-n. Further, remote repository 1004 stores advertisements related to destinations 108a-n, last updated time of the visual menus, rating of visual menus, and so forth.

In case, the audible IVR menu of a destination is changed, caller may not be able to connect to the destination by using Visuphone. Visuphone is configured to detect the error generated while establishing the connection. For example, caller may select a node in the visual menu that may not have a corresponding option available in audible IVR menu, or a connection not be established between device 102 and the destination. The error is detected by update module 914 of Visuphone. Subsequently, update module 914 sends an error report to remote server 1002. Remote server 1002 may check remote repository 1004 for updates related to the visual menu. Thereafter, in case any updates are available, remote server 1002 may send the updates to device 102 for performing the update. In an embodiment, visual menu database 308 may be checked and updated based on a pre-defined time interval by the device 102. In an embodiment, the error report may include the error generated and an Identity (ID) or version of the visual menu on which the error was generated. In case, the updates are not available in remote repository 1004, then an update of remote repository 1004 may be required. In an embodiment of the invention, remote repository 1004 is updated based on a pre-defined time interval. In another embodiment of the invention, the caller can rate the relevance or correctness of the visual menu from device 102. Therefore, remote repository 1004 can be updated based on a cumulative ratings received from callers and other users of the visual menu. The remote server 1002 can comprise a process of continuously scanning the IVRs 108a to 108n updating the remote repository 1004 with changes of various IVR menus and adding addition menu records for new IVRs. Also the remote server 1002 might get a 'problem report' from device 102 if caller identify problem between the menu as it is in the database 308 and the audible menu of a specific IVR. In such case a recheck process will be initiated to update the remote repository 1004 and the new information can be than offered to device 102 for download an update.

In an embodiment of the invention, visual menu database 308 may include other information and parameters related to the visual menus. The parameters related to the visual menus enable accessing, modifying or updating of the visual menus. Examples of parameters of visual menus include, but are not limited to, ID or version of the visual menus, destination phone numbers, and a last update timestamp. Furthermore, visual menu database 308 may include other information such as a profile, the calling history, or preferences of the caller. The calling history of a caller may include the numbers dialed or received, most frequent numbers dialed or received, most frequent nodes selected from visual menus. The profile of a caller may include, but is not limited to, the name, age, sex, address, phone number, profession, office address, recorded voice responses for visual menus, or other personal and professional details of the caller.

With reference to FIG. 11, the exemplary process for presentation of the visual menu is illustrated when the call of a caller is forwarded or transferred from destination 108*a* to destination 108*b*. Destination 108*a* may have completely different audible IVR menus as compared to destination 108*b*. For example, destination 108*a* may be a loan department and destination 108*b* may be an insurance department of a bank. Similarly, the call may be forwarded from one organization to another. Therefore, caller may be required to respond to a different audible IVR menu. Visuphone 104 may be configured to detect that the call has been forwarded and subsequently display the visual menu of destination 108*b*.

As shown in FIG. 11, device 102 establishes a connection with destination 108*a* as depicted by arrow 1102. The connection is established by using the visual menu provided by Visuphone 104 based on destination 108*a*. In an embodiment, the connection is established directly without using Visuphone 104. Thereafter, destination 108*a* may forward the call to destination 108*b*, as indicated by arrow 1104. The visual menu corresponding to the audible IVR menu of destination 108*b* may not be visible on device 102, as the call was forwarded between destination 108*a* and destination 108*b*. In an embodiment, Visuphone 104 may not detect the forwarding of the call. In this case, device 102 may be presented with audible IVR menu of destination 108*b*. Thereafter, Visuphone 104 may record the options and responses on device 104 for the audible IVR menu of destination 108*b*. The recorded options and responses may be stored at remote repository 1004 for updating it. Further, the recorded options and responses may be stored visual menu database of device 102.

In an embodiment, destination 108*b* sends an identity (ID) or version of the audible IVR menu to a caller as shown by arrow 1106. The audible IVR menu ID is specific to the audible IVR menu of destination 108*b*. Subsequently, display module 906 of Visuphone 104 uses the audible IVR menu ID to display the corresponding visual menu. Further, a caller may select a node from the visual menu corresponding to destination 108*b*. Therefore, when a caller selects a node, a connection may be established with destination 108*b*. In an embodiment of the invention, connection between device 102 and destination 108*a* is disconnected after establishing a connection between device 102 and destination 108*b*. In another embodiment of the invention, connection between device 102 and destination 108*a* is maintained for complete communication session till the caller disconnects the call.

Another embodiment of the invention allow visual menu for calls made from a conventional home telephone. FIG. 12 illustrate a phone 1204 connected to a Public Switched Telephone Network (PSTN) 1208 and through a gateway 1218 to the Internet network 1220. Network 1220 may be any service provider that provides services, for example, but not limited to, telephone services, cell phone services, wireless services, Internet services, cable television services, or various combinations of the above or other type of services.

Further, the connection to network 1220 is associated with a wide band Internet 'smart' modem 1206. Phone 1204 may be a regular phone, such as a landline phone or a cordless landline phone. Modem 1206 may be a Digital Subscriber Link (DSL) modem or a cable modem that connects the home device to the Internet and/or computer network. Modem 1206 is connected to a service provider, and can provide the home devices with telephone, Internet and television services. Modem 1206 may provide both wired and wireless connections. As shown with reference to FIG. 12, modem 1206 provides the home with the Internet through wire 1210 to a computer 1202, or through a Wi-Fi connection. Modem 1206 comprises the ability to detect and recognize the dialing made by phone 1204. The numbers dialed by phone 1204 to establish connection are then compared with a database, such as visual menu database 308. Therefore, in case the dialed number corresponds to a destination with an audible IVR menu, and a corresponding visual menu exists then, modem 1206 may provide the visual menu on computer 1202 connected to it. Moreover, modem 1206 may use private web sites to present the visual menu or just provide the dialed number to computer 1202. Thereafter, a software tool on computer 1202 may present the visual menu on the screen of computer 1202.

Once the connection with the destination has been established, 'smart' modem 1206 will continue to monitor the numbers dialed or received by phone 1204 to browse or advance the visual menu accordingly. Furthermore, the numbers dialed or received may be stored for future processing such as highlighting previous selections in the visual menu, providing customized visual menu and so forth. The Visual menu system comprising computer 1202 and Modem 1206 may incorporate additional enhancements as presented before such as automatic dialing of customer information. The automatic dialing may be achieved by using computer 1202 to initiate and execute such automatic dialing.

In another embodiment of the invention, a house television 1212 may be used to present the visual menu. In various houses modem 1206 decodes television signals and transfer it to a set-top box 1216 that provide signals to television 1212. The visual menu may be presented on a channel dedicated for IVR. Therefore, when phone 1204 is used to initiate a call, modem 1206 can detect it and present the visual menu corresponding to the dialed number on the designated channel of the television 1212. Further, all the options described before can be provided now using the screen of television 1212 for the visual menu. The caller selection can be done by using the simple home phone or alternatively using the TV 1212 set top box 1216 remote control. Further, television 1212 screen may be used to present the visual menu in a few alternatives ways. For example, a device provided by a company named RokuInc., allows streaming of content from the Internet to television. Most set-top boxes now have an Internet connection or telephone connections. Furthermore, various devices such as some Digital Versatile Disc (DVD) players, and video game players or controllers such as Xbox or Playstation, can be connected to the Internet. Each of those devices may allow 'smart' modem 1206 to provide a visual menu on the screens of television 1212.

In another embodiment of the invention a telephone connection may be established through an external telephone service by using a computer, as discussed with reference to FIG. 13. External telephone service provider 1310, such as 'Google Voice', which a user may use through the Internet network from computer 1302. In such case, the user can cause a telephone call to be established by indicating on service provider 1310-'Google Voice' web site a request to establish call to a designated location. Thereafter, the external service provider 1310 establishes connection 1306 by using PSTN 1308 to connect the user telephone 1304 to a desired destination 1312. External service provider 1310 can now present the visual menu as discussed above. External service provider 1310 may present the visual menu on its web site and processed or advanced based on the dial choices made by the user on his computer 1302. Furthermore, external service provider 1310 can also add various options as described before, such as but not limited to highlighting previous choices, automatic dialing of user information and presenting related advertisements.

Another enhancement for such external service provider 1310 is to provide a 'smart' connect. In case of the 'smart' connect, the user can designate not just destination 1312, but a specific node of visual menu, such as node 212b as discussed with reference to FIG. 2B. The 'smart' connect will dial the proper selection in the visual menu and connect to node 212b of the audible IVR. The 'smart' connect can even wait until the selected node 'Talk to Executive' yields the desired result of the executive answering the line and then connect the user. Therefore, the efficiency of the IVR system does not come at the cost of inefficiency of the user, rather both sides can became more efficient by using the 'smart' connect.

Additional alternatives to the invention are illustrated with reference to FIGS. 14A, 14B, and 14C. FIG. 14A illustrates a Visu-Add-on 1404 which can be connected to a standard home phone 1402 to provide all the features and functionalities as described above with respect to the Visuphone 104. Accordingly, phone 1402 may be connected through connection 1406 to add-on 1404 that can be connected to a standard telephone connection line 1410. Add-on 1404 may comprise a processing unit, a display and a database. The database may be similar to visual menu database 308 as discussed in FIG. 3. Therefore, when phone 1402 is used to call a destination with an audible IVR menu, a corresponding visual menu is presented on the display of add-on 1404. Furthermore, the display of add-on 1404 may comprise a touch sensitive screen for added convenience of a user. Add-on 1404 may be loaded and updated by the use of removable memory devices, such as USB flash memory 1408. Alternatively, Add-on 1404 may comprise a modem to connect either by the use of the telephone connection line 1410 or by wireless means such as WiFi or Bluetooth.

FIG. 14B illustrates an embodiment, where an add-on unit 1414 is plugged into a conventional digital picture frame 1420 by using a USB port. Digital picture frames recently became quite popular as a convenient way to display family photos in digital format. In this embodiment, picture frame 1420 can display family photo until a call is made by using a phone 1412 to a destination with an audible IVR menu. Phone 1412 may be connected to picture frame 1420 through a connection 1418 and add-on 1414 may be further connected to standard telephone line connection 1422. Add-on 1414 may comprise a processor and a database. The database may be similar to visual menu database 308 as discussed in FIG. 3. Therefore, when a connection is made to a destination having an audible IVR menu, then add-on 1414 will present the visual menu on picture frame 1420. Picture frame 1420 may resume presenting the photos after the completion of the call. Furthermore, the database of add-on 1414 could be updated with one of the options described before in respect to the add-on 1404 of FIG. 14A. It should be noted that various home television provides functionality similar to picture frame 1420. Therefore, television can be used as an alternative to picture frame 1420.

FIG. 14C present another embodiment that can be applied as presented with respect to FIGS. 14A and 14B. It quite common these days to use a telephone handset 1424 that are connected by wireless means to a base station 1430 that is connected by a wire 1432 to the standard telephone lines. Add-on 1426 can comprise an internal radio circuit to detect the wireless communication. Therefore, add-on 1426 can detect the communication between handset 1424 and base station 1430 to present the visual menu. As can be seen with reference to FIG. 14C, connection through wires such as wires 1406 or 1418 may not be required. Add-on 1426 may be provided by the manufacturer of the handset 1424 and the base station 1430, or by a third party. A person skilled in the art will appreciate that the functionalities of the add-on units as described in conjunction with FIGS. 14A, 14B and 14C can be combined into a single unit. Therefore, a single add-on unit may be used in various environments as discussed above.

Figure 15A:
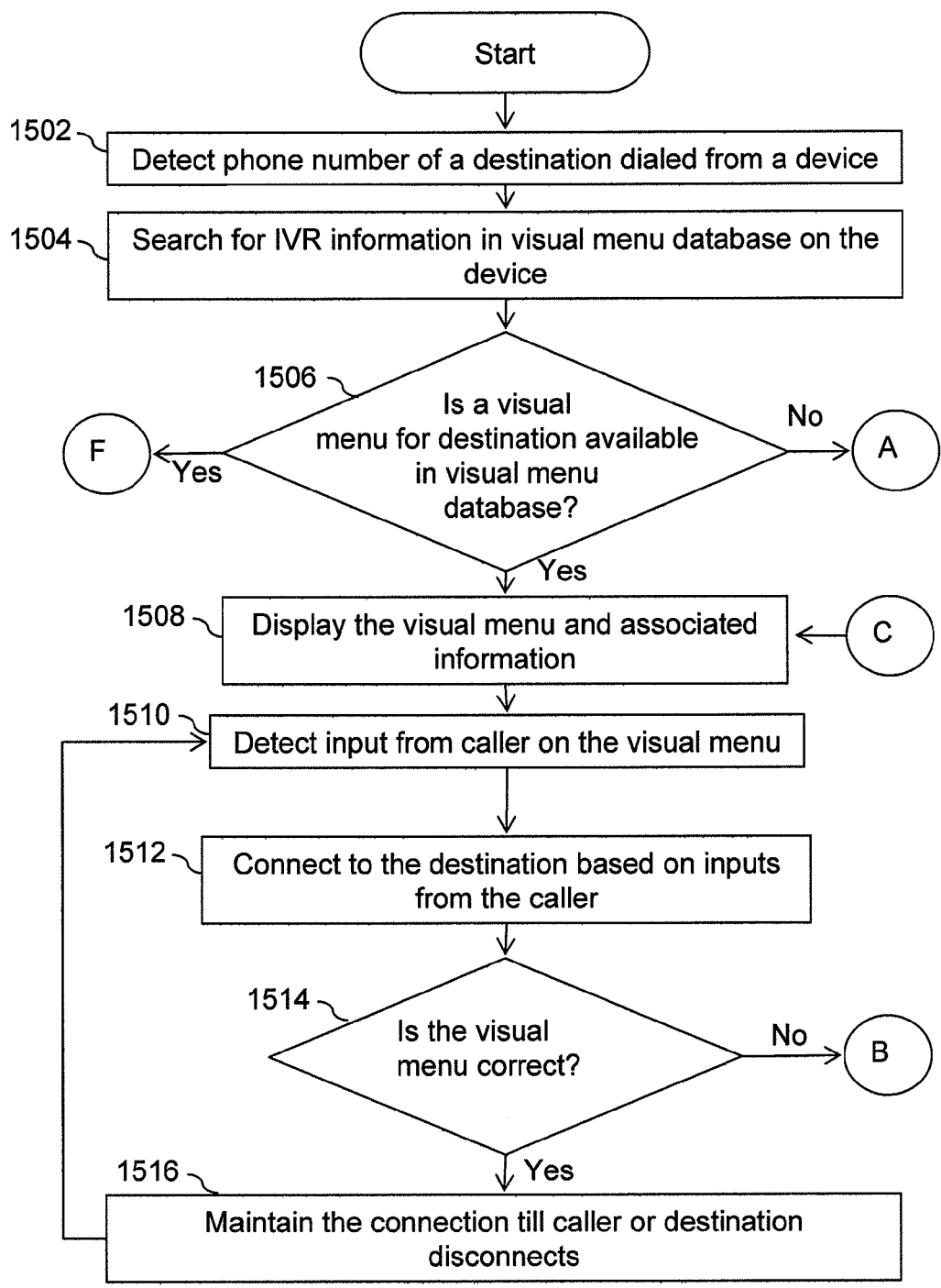
Figure 15B:
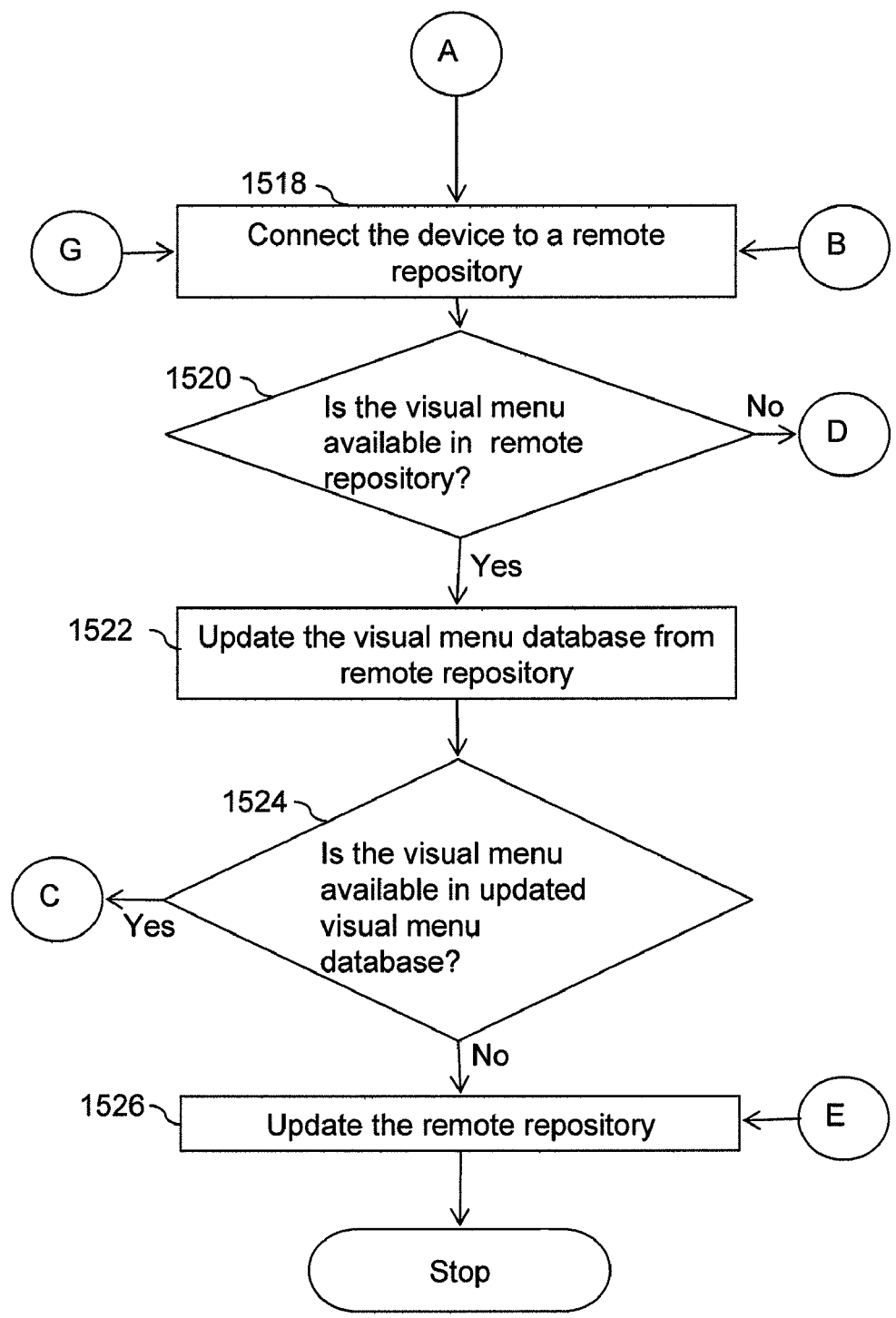
Figure 15C:
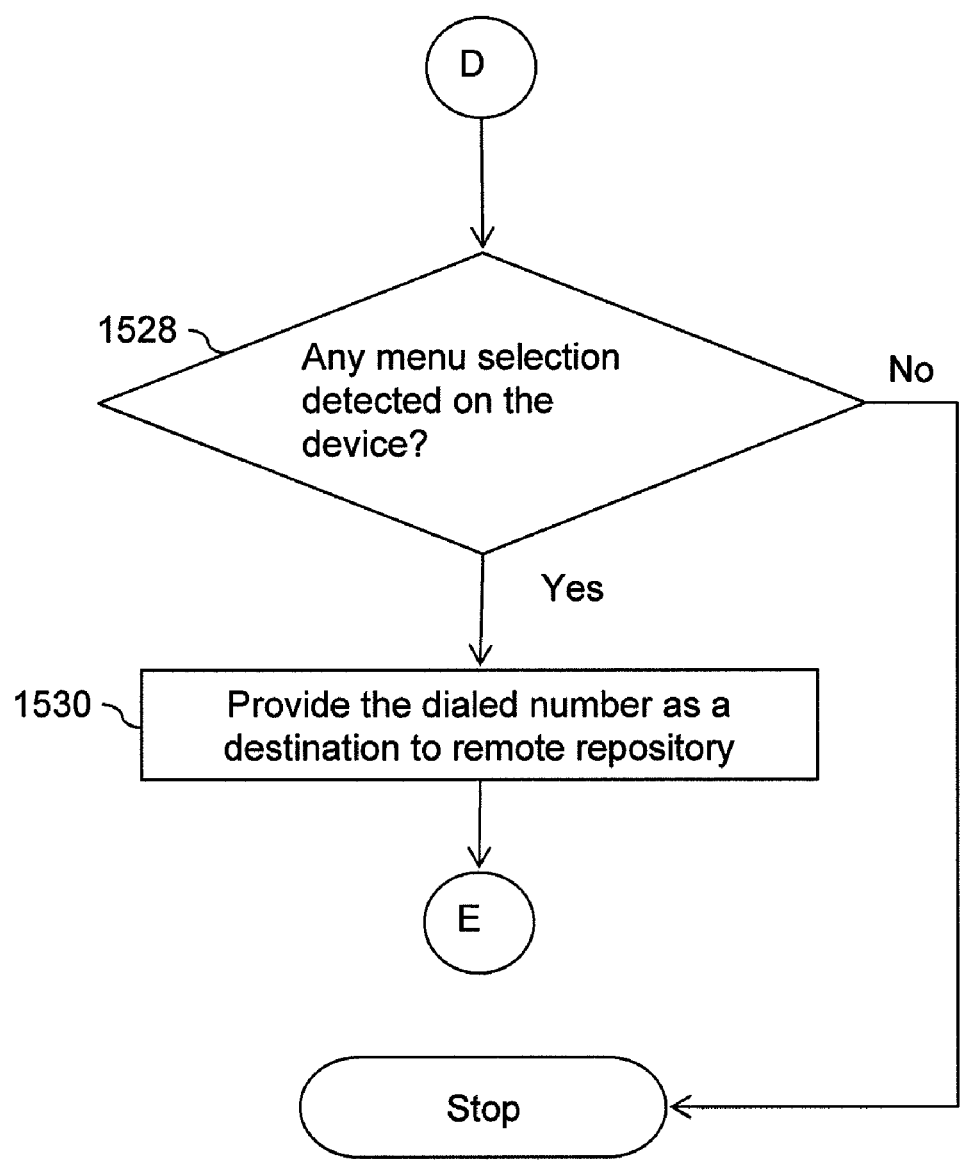
Figure 15D:
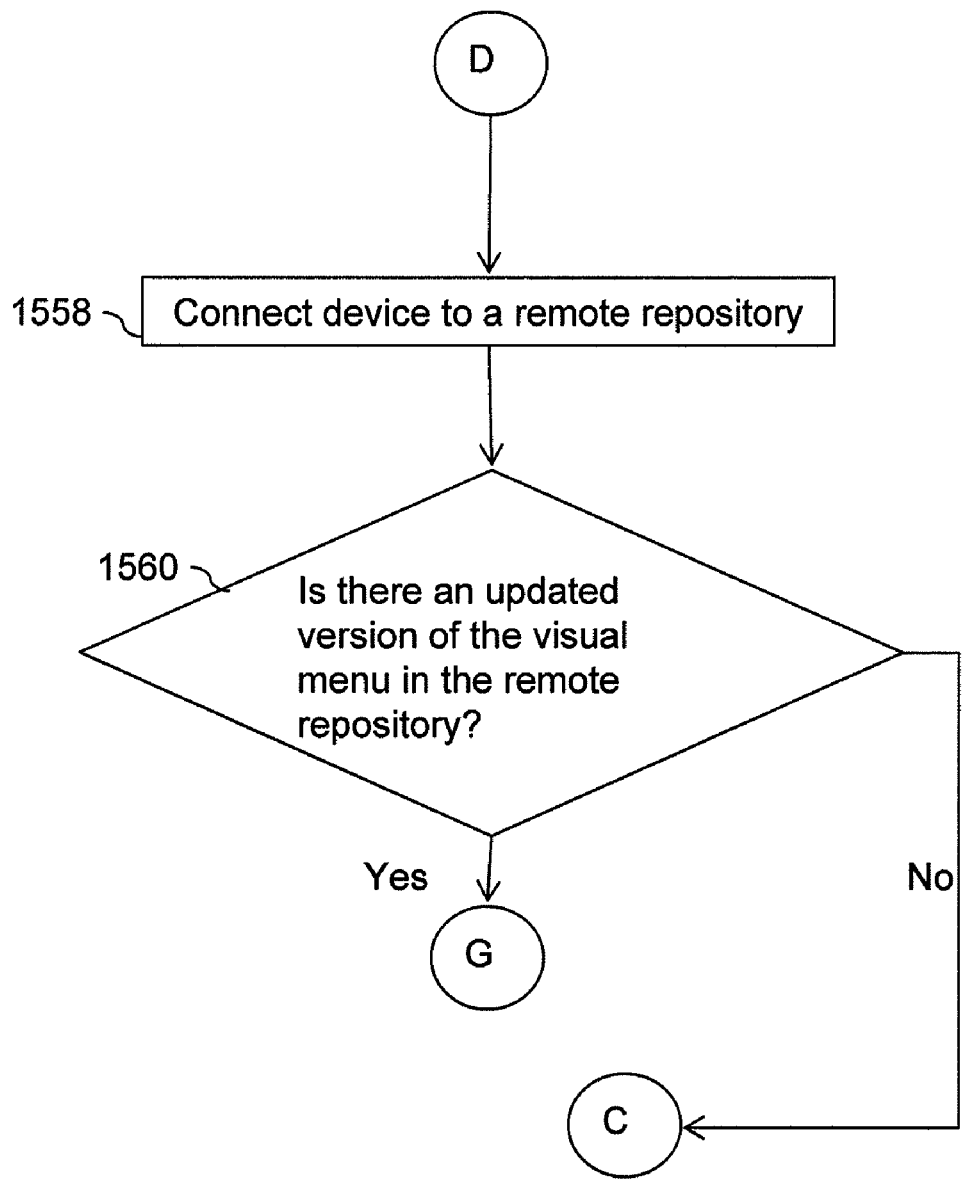

FIGS. 15A, 15B, and 15C illustrate a flowchart diagram for presentation of the visual menus, in accordance with an embodiment of the invention. Caller 106 may dial, select or receive a number to connect to a destination from device 102. The destination may include an audible IVR menu for interaction with a caller. Further, device 102 may include Visuphone 104 to present a visual menu corresponding to the phone number of the destination. Therefore, a caller can directly interact with an IVR of destination through the visual menu without listening to the audible IVR menu.

At step 1502, Visuphone such as of device 102 detects a phone number dialed, selected or received by caller for destination. In an embodiment of the invention, the number is clicked according to the display of device 102. The number is detected by detection module 902 of Visuphone 104. Thereafter, search module 904 searches visual menu database 308 of device 102 for the phone number, at step 1504. Search module 904 searches for visual menu and other information corresponding to the phone number. Other information may include, for example, the caller profile, call history of the caller, advertisement associated with the phone number and so forth. In an embodiment of the invention, search module 904 searches visual menu database 308 in real-time. Therefore, the visual menu and other information may be searched with only a few digits of the phone number.

At step 1506, it is determined by search module 904 whether the visual menu and other information are available for the phone number in visual menu database 308. In case, the visual menu is available, then the process continues to step 1508. In case, the visual menu is not available, then device 102 may be connected to remote repository 1004 by update module 914, at step 1518 as shown with reference to FIG. 15B. Thereafter, it is checked whether the visual menu is available in remote repository 1004, at step 1520. Subsequently, if the visual menu is available, then visual menu database 308 is updated from the information available at remote repository 1004, at step 1522. The process then continues to step 1524.

Further, at step 1506, once it been determined by the search module 904 that the visual menu for the destination is available in the visual menu database 308, an asynchrony request is sent to remote repository 1004, at step 1558. The request is sent to check whether a newer version of the menu with different content is available, at step 1560. Subsequently, if such version exists in remote repository 1004, then visual menu database 308 is updated accordingly, at step 1522. The process is then continues to step 1524.

In case, the visual menu is not available in remote repository 1004, then the process continues to step 1528. At step 1528, audible IVR menu selection in detected on device 102. The audible IVR menu selection may be determined based on Dual Tone Multi Frequency (DTMF) tones or keys pressed by the user of device 102. Thereafter, in case a selection is detected, then the dialed number may be detected as a possible destination number. The dialed number may be provided to remote repository 1004 at step 1530. Thereafter, the process continues to step 1526, where remote repository 1004 is updated for information.

At step 1524, it is determined by search module 904 if visual menu is available for the dialed number in updated visual menu database 308. In an embodiment, Visuphone detects the correctness of information based on the error received on connection to the IVR destination or behavior of the caller. In case, visual menu is available, then the process continues to step 1508. Otherwise, in case the visual menu is not available, then the process continues to step 1526, where remote repository 1004 is updated for information. In an embodiment, Visuphone 104 sends an error report to remote repository 1004 to initiate the update. The error report may include the error details of connection, behavior of the caller and other information required to update remote repository 1004. In another embodiment, the caller may provide ratings for the correctness of the visual menu and other information. Subsequently, the ratings are sent to remote repository 1004. In an embodiment of the invention, ratings from multiple devices are received at remote repository 1004. Thereafter, remote repository 1004 may be updated based on the ratings. In an embodiment of the invention, remote repository 1004 may be updated based on a pre-defined time interval. In another embodiment of the invention, remote repository 1004 is updated by an administrator of remote server 1102.

At step 1508, if the visual menu is available in the visual menu database, then the visual menu corresponding to the audible IVR menu of destination is displayed on device 102. In an embodiment of the invention, advertisements related to the type of destination are also displayed on device 102. At step 1510, inputs from the caller are detected on the visual menu. In an embodiment, the inputs include the nodes of the visual menu selected by the caller. In another embodiment, the inputs include the advertisement selected by the caller. Subsequently, device 102 is connected to destination based on the inputs provided by the caller, at step 1512. At step 1514, it is determined if the visual menu displayed on device 102 is correct. In case, the visual menu is not correct, then the process continues to step 1518. Thereafter, the process steps as discussed above are followed. However, in case the visual menu is correct, then the connection between device 102 and destination is maintained, at step 1516. Moreover, further inputs from the caller are received, to continue the communication till the caller or destination disconnects the connection.

The information stored in remote repository 1004 may be gathered from various destinations. For example, various destinations may be called to detect audio IVR menus and accordingly generate the information for remote repository 1004. With reference to FIG. 16 exemplary components of a device 1602 for implementing a database construction system 1606 are illustrated. Device 1602 can be a computing device such as, but not limited to, a server, a personal computer, a laptop, a mobile phone, a smart-phone, and so forth. Device 1602 can connect to network 1614 through a network interface 1612. Further, device 1602 can connect to a PSTN 1618 through gateway 1616 and network 1614 through network interface 1612. Examples of network 1614 include, but are not limited to a LAN, WAN, the Internet and so forth. Although not shown, device 1602 can connect to various external devices such as hard disks, mouse, keyboard, speaker, microphone, displays, Universal Serial Bus (USB) devices and so forth. Further, device 1602 can connect to various destinations 1620*a-n* through PSTN 1618. Destinations 1620*a-n* may provide audio IVR menu services. In an embodiment of the invention, device 1602 can connect to various devices that include Visuphone for providing updates to visual menu database 308.

Device 1602 may include a memory 1604 that stores various programs, data and/or instructions that can be executed by a processor 1610. Examples of memory include, but are not limited to, a Random Access Memory (RAM), a Read Only Memory (ROM), a hard disk, a computer-readable medium and so forth. A person skilled in the art will appreciate that other types of computer-readable media which can store data that is accessible by a computer, such as magnetic cassettes, flash memory cards, digital video disks, and the like, may also be used by device 1602. Memory 1604 may include Database Construction System (DCS) 1606 for gathering audible IVR menu information, which could be called the IVR customization record, from the destinations and store it in a records database 1608. In an embodiment of the invention DCS 1606 may be an application stored as software or firmware on device 1602.

DCS 1606 may include various modules or instructions that may be executed by processor 1610 for generating information in records database 1608, as explained in detail with reference to FIG. 17. As discussed above, DCS 1606 may be implemented as software, or firmware on a device. DCS 1606 may be implemented as a standalone module or as several independent instances performing similar jobs without coupling to the IVR destinations. Further, the non-coupling may be managed by a centralize module that may allocate different IVR destinations to each implementation instance of DCS 1606. In an embodiment of the invention, DCS 1606 and record database 1608 may be implemented on different devices.

Records database 1608, may include multiple records. Further each record may include an IVR identity code, multiple internal destinations and an activation code for each said internal destination. The IVR identity code may be for example, the phone number of the destinations. The activation code may be for example, a telephone key that should be dialed such as a dial tone associated with the phone number. The internal destination is usually an extension to which the call will be forward once the caller makes a choice, according to the provided menu, and apply the activation code that is usually a dial tone transmitted to the IVR from the Visuphone once the caller dials or selects a proper number or option. Each internal destination may further include another internal destination or extension that may be referred to as a sub-internal destination. Moreover, each sub-internal destination may be associated with a sub-record. Furthermore, the internal destinations may be associated with an icon code. As discussed above, the icons provide a convenient display for the user of a visual menu. In some audible IVR menus the activation code may be a voice command that could be activated by the caller by voicing his selection, or the Visuphone may transmit a pre-recorded voice command or a synthesized voice command when the caller makes a selection from the option menu of the visual menu provided by the Visuphone. Further, records database 1608 may include a record of the metadata or keywords associated with the various options in the menus. The metadata and/or keywords may be used by the Visuphone to enable the caller to search for a desired menu by providing keywords. In an embodiment of the invention records database 1608 is remote repository 1004.

FIG. 17 illustrates exemplary components of DCS 1606, in accordance with an embodiment of the invention. DCS 1606 may include a Database Construction Agent (DCA) 1720 for generating information in records database 1608, as explained in detail with reference to FIG. 17B and FIG. 17C. Some destinations may provide downloadable records or information for the callers. Download module 1710 of DCS 1606, downloads the information or records provided by the destinations. For example, download module 1710 may download recorded voice phrases, audio data of the audible IVR menu, activation codes, complete audible IVR menu file in a variety of formats and so forth. In an embodiment of the invention, DCS 1606 may connect to various devices that include Visuphone. Therefore, DCS 1606 may receive information from Visuphone, such as personal records, customized records of the callers, and frequently used numbers, keys and so forth. In an embodiment of the invention, download module 1710 may obtain permissions before downloading the information. The permission may be obtained from the user, the destination or both. For example, download module 1710 may display a notification on screen on the device to the user or administrator to permit or reject a download. Moreover, download module 1710 may send an authorized communication such as, but not limited to, a private key to the destination to authorize and obtain permission for download. Personalization module 1708 may generate personalized records for the callers by associating the personal information of the caller with the information, such as the telephone numbers stored in records database 1608. The records can then be forwarded to the user's device by download module 1710. Personalization module 1708 may be implemented as instructions executable by a processor. For example, the processor can be processor 1610 or a second processor dedicated for personalization module 1708. Moreover, the second processor may be CPU 304, CPU 504 or implemented in another device in communication with DCS 1606.

DCA 1720 may include a Target List Module (TLM) 1722 that assigns the IVR destination or a target list to each instance of DCA 1720 for connecting and gathering information. The target list may include the IVR identity code, which can be as phone number or any type of information on how to connect to the IVR directly or indirectly. Further, the target list may include additional details such as internal destination. In an embodiment of the invention, the additional information of the internal destination may be implemented as one or more activation codes associate with the IVR identity code.

DCA 1720 may include an IVR Tracking Module (ITM) 1724 that tracks IVR content from a root location associated with the Target information assigned by TLM 1722. ITM 1724 constructs the full IVR content from a given IVR root.

ITM 1724 may include IVR Logic Module (ILM) 1726. ILM 1726 may detect the type of IVR of the destination. Typically, various types of audible IVR menus are implemented by destinations. The audible IVR menus may be categorized into various types, such as a simple IVR, IVR with audio response, IVR with additional data authentication and so forth. ILM 1726 detects the type of audible IVR menu, and accordingly the information is generated for records database 1608. Various categories of the audible IVR menu are explained in detail in conjunction with FIG. 19. ITM 1724 may call the destinations to determine the category the audible IVR menu. Thereafter, ILM 1726 constructs the database based on the category of the IVR. In an embodiment of the invention, ITM 1724 may call the destinations multiple times to determine the category of the invention. Various audible IVR menus may include a legal notice. For example, the audible IVR menu of a mortgage bank usually include an header stating that this is debt collector and anything stated during the call could be used for future collections. Other statements can be such as those that relate to the option to record the call and so forth. ILM 1726 may detect the legal statements and store them in records database 1608 in association with IVR identity code.

ILM 1726 as part of its internal algorithm will drive the interaction sessions with the IVR. ILM 1726 may include data structure optimized with the tracked IVR menus to decide a right path or a next choice at any existing stage of the IVR tracking. The decisions made by ILM 1726 may be optimized as a mathematically directed graph tracking process. The tracking process may use an option from the audible IVR menu that corresponds to a "return to a previous menu" option of the audible IVR menu. As a result, the number of sessions required for tracking the audible IVR menu is reduced.

The process of IVR tracking may require multiple communications with the audible IVR menu to completely determine the content. Further, during the tracking process the content of the audible IVR menu may be discovered partially. Therefore, ITM 1724 may include a Tree Storage Module (TSM) 1728 to manage a temporary database record. Thereafter, when the process or a phase is complete, TSM 1728 may use Repository Connection Module (RCM) 1738 to submit the content as a batch of records to records database 1608. In case, a connection to records database 1608 is not available, then TSM 1728 may accumulate the information until a connection can be established.

Dialog Module 1730 of ITM 1724 interacts with the audible IVR menu. Further, dialog module 1730 manages the IVR requests and sends responses according to the decisions of ILM 1726. Further, dialog module 1730 may use a Speech Recognition Module (SRM) 1732 to interpret the audio of the IVR request to generate multiple records for records database 1608. In an embodiment of the invention, the audio is interpreted to generate text information. Moreover, SRM 1732 can provide a score to the text generated for each audio, according to the amount of guessing that is required for translating the IVR audio request. SRM 1732 may use a single grammar or a combination of dedicated grammars, for example, but limited to, a specific IVR service topic, IVR service sub topic, IVR stage, IVR location, the specific IVR, the hour of the day, and so forth. Furthermore, SRM 1732 may use multiple preset terms stored in the memory. Examples, of preset terms include, but not limited to, "yes", "no", name of the caller, and so forth. The text generated by SRM 1732 from speech recognition may be parsed by dialog module 1730 to enable ILM 1726 to select a next path or option.

Dialog module 1730 may be required to respond to the IVR requests during a tracking session. Dialog module 1730 may use a response module 1734 to generate the required response. Various audible IVR menus require a voice response from the caller. For example, the voice response may be required for the authentication of the caller. Response module 1734 may provide a recorded voice response to the audible IVR menu. For example, the voice response may be recorded voice phrase or preset of terms such as, but not limited to, "yes", "no", name of the caller, and so forth. Further, the voice response may be a synthesized voice response, generated by response module 1734. Therefore, response module 1734 may include a voice synthesizer. In this case, the activation code may be the recorded voice phrase and/or the synthesized voice phrase. Moreover, response module 1734 may include a voice decoder to recognize the voice. For example, the voice prompts generated by an audible IVR menu. In some other cases, the IVR menus may require a simple key tone (DTMF). The response module 1734 may include recorded tones or an internal module to generate the require tones.

Various destinations may provide a different audible IVR menu in the working hours and a different menu after working hours or during the holidays. DCA 1720 may detect the various times or time periods for which the audible IVR menus are presented in different mode. SRM 1732 may decode the voice from the audible IVR menu to recognize the IVR message. Further, ILM 1726 may analyze the response message for the periods and different operating mode. Therefore, ILM 1726 may call the destinations based on the recognized periods to generate records database 1608. Further, records database 1608 may include the time information for which a particular audible IVR menu is active. Accordingly, ITM 1724 may call the destinations multiple times based on the time information.

Various audible IVR menus include multi-level menus, as discussed with reference to FIG. 2A. Therefore, each level of menu may include sub-menus, which may further include sub-menus, and so forth. Accordingly, records database 1608 may include multiple sub-records, and each of the sub-records may have activation codes associated with them. Furthermore, records in records database 1608 may include a code to indicate a business domain of the destinations, such as airlines, banks and so forth. In an embodiment of the invention, TLM 1722 may use a web-based list such as yellow pages to call the destinations. Generally, the phone numbers of the destinations in the yellow pages are organized based on the business domains of the destinations. Accordingly the business domain code could be added to record database 1608. As graphics and icons are very effective in enhancing user interface, ITM 1724 may associate various phrases with specific icons. For example, ITM 1724 may include a dictionary of various terms or phrases that are frequently used in IVR menus, such as "customer care", "main menu", and so forth. The terms may be decoded by dialog module 1730 and icons may be associated with them. Accordingly, records database 1608 may include a code for icons associated with the IVR menus of the destinations.

ITM 1724 may include components to connect to the audible IVR menu. As shown with reference to FIG. 17B, ITM 1724 may include a VOIP connection module 1736 to interact with a VOIP application 1740. VOIP application 1740 may be implemented within or outside DCA 1720. In such a case, VOIP connection module 1736 may use VOIP application 1740 to interact with the audible IVR menus.

Further, as shown with reference to FIG. 17C, ITM may include an IVR connection module 1737, to interact directly with the audible IVR menu. IVR connection module 1737 may connect to multiple audible IVR menus through a network, a PSTN or any other communication or protocol. Moreover, IVR connection module 1737 may act as a gateway between DCA 1720 and the destination of audible IVR menu.

FIG. 18 illustrates a flowchart diagram for generating records database 1608 by using DCS 1606, in accordance with an embodiment of the invention. The audible IVR menus of destinations may be analyzed to generate records database 1608 for corresponding visual menus. At step 1802, a phone number may be dialed to connect to an audible IVR menu of destination. The phone numbers and destinations may be selected automatically from a database of phone numbers. For example, yellow pages for a selected territory, category, business or other suitable classifications. As discussed with reference to FIG. 2A, the audible IVR menu may include various options for a user to select. Typically, the options are structured and presented in form of levels to the user. For example, with reference to FIG. 2A, options 204a, 206a, and 220a may form a first level of the audible IVR menu 222a. Further, options 208a and 210a may be referred to as sub-menus to option 204a. Similarly, each sub-menu may further comprise sub-menus, such as options 214a and 216a. Therefore, DCS 1606 is presented with audible instructions at first level. Thereafter, based on the selection by DCS 1606, corresponding audible instructions of sub-menus may be provided. The first level of the audible IVR menu is analyzed at step 1804. The audible IVR menu may be analyzed by voice recognition.

In an embodiment of the invention, the voice recognition for constructing records database 1608 is based on context-enhanced voice recognition. As the process of calling the destination is initiated by selecting a number from a list such as yellow pages, the voice recognition system would be provided file of potential menu terms, which could be farther narrowed base on knowledge of the business domain and the potential options such destinations may offer. Therefore, the process of voice recognition is greatly enhanced, when the recognition is done with respect to a relatively small number of choices. SRM 1732 in DCA 1720 may be pre-loaded with a small set of terms most likely used by the destination and, therefore, may be required to make the recognition out of the relatively small set of terms.

Further, the voice may be converted to a text format. In an embodiment of the invention, a voice-to-text application may be used to convert the audible instructions to text format. Subsequently, the information generated from the analysis of the first level is stored in records database 1608, at step 1806. The information may include the details about the sub-menu and the numbers to be dialed to access the sub-menu. For example, with reference to FIG. 2A, the information for option 204A may include, instruction part 'pizza order' and number part '2' in the database. At step 1808, it is determined whether there are any sub-menus in the audible IVR menu. The sub-menus may be detected based on the information analyzed from the audible IVR menu. In an embodiment of the invention, sub-menus are detected based on the information stored in the database. In case the audible IVR menu contains sub-menus, then the sub-menus are analyzed, at step 1810. The sub-menus may be analyzed in a similar manner as the first level of audible IVR menu as discussed above. Subsequently, at step 1812, the information corresponding to the sub-menus is stored in records database 1608. At step 1814, it is determined whether there are any further sub-menus in the sub-menus of the audible IVR menu. DCS 1606 may make select an option for every menu to connect accordingly and determine if a final destination is reached or there is another layer of menu options to be processed. Once the final destination it reached, DCS 1606 may "hang-up" the connection and register the results. Further, DCS 1606 may dial again to iteratively discover the full menu of the IVR. In case, there are further sub-menus then each sub-menu is analyzed as discussed above. The process is iterated till the complete audible IVR menu with the sub-menus is analyzed. Further, the destinations may be dialed multiple times to ensure that complete audible IVR menu and sub-menus are analyzed. Moreover, records database 1608 may be automatically checked and verified after complete analysis of the audible IVR menu. For example, all or various options or sub-menus in the audible IVR menu may be selected randomly or based on a pre-defined pattern to verify the information in records database 1608. In an embodiment of the invention, DCS 1606 may be use quality marks for every term recognized during the process. For example, low marks may indicate relatively higher probability that the recognition was wrong. Further, follow-up steps may provide higher priority to check and validate the terms that received low marks. Such check may be performed by an additional automatic system or by human operators. In an embodiment of the invention, the destinations may be connected automatically through various probe servers to analyze the audible IVR menus. The probe may be implemented as a script, a computer program, or firmware, on remote server 1002, as shown with reference to FIG. 10. Further, the audible IVR menus may be analyzed by human operators, in case of malfunction or other issues with the automatic functioning.

In an embodiment of the invention, records database 1608 may be updated automatically based on a pre-defined update time interval. The update may be required to validate the correctness of information in the database. Moreover, records database 1608 may be updated based on ratings from users of Visuphone. For example, the caller may identify that a visual menu incorrect or incomplete, and may subsequently provide a rating to the visual menu. Further, an administrator or user of records database 1608 may update it manually.

Various audible IVR menus require audio commands from the caller instead of selecting options. DCS 1606 analyzes such IVRs to generate records database 1608. In an embodiment of the invention, a two-phase process may be applied to generate records database 1608. In the first phase a standard menu is generated for the IVR that may relate to a particular class of the destinations. A class can be a business class, for example, banks, airlines, hospitals and so forth. The first phase could be extended to cover as many domains as possible so that standard menus exist for most business classes of destinations. In the second phase, the IVR that requires a natural language voice command may be interrogated by repetitively applying the standard menus according to the class. Therefore, the relevance of the standard menu for the specific IVR is confirmed. In the process, a stored voice or synthesized voice could be use for each menu option. Thereafter, the menu may be stored in records database 1608 based on the confirmation. Some IVR menus may be require any or both of natural language commands and dial tones. In such a case, both options could be made available in the records database 1608, and eventually in the visual menu database for the caller at the time of use. As discussed with reference to FIG. 17, DCS 1606 may determine the type of audible IVR menu for generating records database 1608.

FIG. 19 illustrates an exemplary set of IVR categories 1902. As shown a category A 1904 refers to typical audible IVR menus that present IVR options to the caller that can be selected from simple dial tone selections. In this case, DCS 1606 may provide various dial tones to the IVR for analyzing it, and generating records for records database 1608. A category B 1906 refers to an audible IVR menu that requires the caller to answer some initial questions, before presenting simple dial tone options for further menu. For example, the caller may be required to select a language preference, before presenting the menu. A category C 1908 may require the caller to provide some personal information before presenting the menu. For example, the caller may be required to input an account number, a phone number, a customer number and so forth. A category C 1910 refers to an IVR menu that may require voice inputs or natural language selection from the caller. In this case, DCS 1606 generates an activation code that points to a recorded voice phrase or a code that can instruct to synthesize the proper voice phrase required.

Additional variations of the categories include an IVR menu that provides a legal notice. For example, the audible IVR menu of a mortgage bank usually include an header stating that this is debt collector and anything stated during the call could be used for future collections. Other statements can be such as those that relate to the option to record the call and so forth. The statement may be registered and added to records database 1608, so that the legal statement can be presented with the visual menu. Further, additional statements may be added at the end of the statements regarding the last time when the IVR was verified.

FIG. 20A illustrates an exemplary information process for an IVR menu stored in records database 1608. Sometimes, an audible IVR may request the caller for some specific or personal information that is other than selection of IVR options. ILM 1726 may mark such requests and process them separately. ILM 1726 can identify the such requests based on a combination of the identity code and an ordered list of activation codes. As shown, the records database content 2002 may include exemplary request 2004*a* "Please enter the invoice number", request 2006*a* "Please enter the payment amount", request 2008*a* "Please choose your payment card: Press 1 for VISA and 2 for Mastercard", request 2010*a* "Please say or enter credit card number", and request 2012*a* "Please enter your Credit Card expiry date".

Corresponding to these requests a display may be generated on the user's device, an exemplary illustration is as shown with reference to FIG. 20B. As shown, a web form 2014 is generated corresponding to the requests. Web form 2014 may be presented on a web browser of the user's device. In another embodiment of the invention, the display is presented as an independent form on the display of the device. Therefore, the device may not require a web browser application. Web form 2014 may include single or multiple pages. Further, in case the information is displayed directly on device, then various screens, layers or scroll may be used to display the information. Web form 2014 may include an input box 2004*b* corresponding to request 2004*a*, input box 2006*b* corresponding to request 2006*a*, input box 2008*b* corresponding to request 2008*a*, input box 2010*b* corresponding to request 2010*a*, input box 2012*b* corresponding to request 2012*a*, and a submit button 2016. The Visuphone on the user's device may automatically complete some or even all the require details based on stored profile or previous inputs of the user. Therefore, the user may only (if at all) be required to complete the missing information manually. Subsequently, the Visuphone may connect to the IVR after the user clicks on the submit button 2016. Further, the Visuphone may navigate to the process root within the IVR menu, revalidate the process input requests, and transmit the user data to the IVR without any action from the user. Moreover, the Visuphone may hide the IVR validation question such as questions like "are you sure", "did you mean XXX?", and so forth. After the submission, a response such as, but not limited to, a receipt number, specific flight landing time, and so forth may be presented to the user. The response from the IVR can be in various forms, for example, but not limited to, a recorded audible response or a transcript of the audible response.

In another embodiment of the invention, electronic yellow pages directory allows the dialing the number directly from the directory and further provides the visual menu of the destination. The caller can select the exact destination before dialing or follow the visual menu after dialing. For example, an airline company might have various option, menus and layers in the large organization. Selecting the exact department in the organization before dialing can save the user the time and overhead of listening to the menu and making decisions based on the voice menu. The yellow pages company can have a copy of the visual menu database or can be connected to a visual menu service in order to provide the menu to the user.

Alternatively an enhanced web base yellow page could be provided, wherein the caller can first choose the provider he requires to contact. Thereafter, if that destination provides an IVR, then the enhanced yellow page will use the visual menu database to present a visual menu on the web page. Moreover, the caller can click to choose the internal destination of that provider and the enhanced yellow page may accordingly initiate the call. The call could be made using the conventional telephone network or PSTN. In this case, the enhanced yellow page may need the caller's telephone number to perform the connection. Alternatively, the enhanced yellow page could use VOIP to connect the caller over the web to the IVR of the destination.

In some IVR systems, the caller may have to wait or hold on a queue of previous dialers until the specific department or agent is available. In another embodiment of the invention, the enhanced yellow page system will connect the caller only after the specific agent is available, without waiting in a long waiting line queue. The system can recognize that the waiting queue message of the specific department, and to connect the user only after the agent is answering. Therefore, the waiting time of the caller on the phone queue that sometimes may be very long, may be reduced. The system can park on the line for the waiting line on the specific entry in the menu, as soon as the agent is available, the caller gets a signal to start the conversation with the agent.

Additional advantage of the invention relates to callers who are more proficient in foreign language. Visuphone may provide the visual menu in multiple languages. A caller can than choose a language of his choice and download to his device database the menu in that language.

Yet another advantage of the invention relates to IVR that ask for voice commands. This IVR interface is for some user harder to use due to accent or other problems. The database could be provided with the option as been described before for the system to output voice command according to caller selection of the menu options.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for enhancing user interaction with Interactive Voice Response (IVR) destinations, the system comprising:
   a processor; and
   a memory coupled to the processor, the memory comprising:
      data encoding a database, the database comprising a list of telephone numbers associated with plurality of destinations each implementing an IVR and at least one menu for the interactive voice response for each of said IVR; wherein said destinations are grouped based on at least one category within said database, and
      instructions executable by the processor for automatically communicating with at least one user; and
      instructions executable by the processor to pull at least one menu from said database and transfer it to display said menu to said at least one user,
         wherein said menu is a standard menu associated with the category related to the telephone number dialed by said at least one user.

2. The system of claim 1, wherein said memory further comprises instructions executable by the processor for converting said at least one user choice to the specific instruction for the specific destination related to said telephone number dialed by said at least one user according to the information in said database.

3. The system of claim 1, wherein said menu comprises at least one icon.

4. The system of claim 1, wherein said memory further comprises instructions executable by the processor for generating at least one personal record from said at least one user and storing said at least one personal record in the database.

5. The system of claim 1, wherein said memory further comprises instructions executable by said processor for associating a personal record of at least one caller with at least one of said telephone numbers and with said at least one caller's phone number.

6. The system of claim 1, wherein said data base comprise time category for pluralities of menus and wherein said instructions executable by the processor to pull at least one menu comprise the step of checking the current time and pull menu that its time category fit said current time.

7. The system of claim 1, wherein said memory further comprising instructions executable by said processor to display at least one advertisement, wherein said advertisement is displayed based on said telephone number dialed by said user.

8. The system of claim 7, wherein said at least one menu comprises at least one icon.

9. The system of claim 7, wherein said memory further comprises instructions executable by the processor for generating at least one personal record of said at least one user and storing said at least one personal record in said database.

10. The system of claim 7, wherein said menu is a standard menu associated with the category related to the telephone number dialed by said at least one user.

11. A system for enhancing user interaction with Interactive Voice Response (IVR) destinations, the system comprising:
   a processor; and
   a memory coupled to the processor, the memory comprising:
      data encoding a database, said database comprising a list of telephone numbers associated with plurality of destinations each implementing IVR and at least one menu for the interactive voice response for each of said IVR; wherein the destinations are grouped based on at least one category;
      instructions executable by the processor for automatically communicating with at least one user;
      instructions executable by the processor to pull at least one menu from said database and transfer it to display said at least one menu to the user; and wherein
   said data base comprise time category for pluralities of menus and wherein said instructions executable by the processor to pull at least one menu comprise a step of checking the current time and pull menu that its time category fit said current time.

12. The system of claim 8,
   wherein said memory further comprises instructions executable by said processor for downloading one or more activation codes associated with at least one personal record of the user, and
   wherein said activation codes are associated with one or more internal destinations of said at least one personal record.

13. The system of claim 12, wherein said memory further comprises instructions executable by the processor for converting said at least one user choice to the specific instruction for the specific destination related to said telephone number dialed by said at least one user according to the information in said database.

14. The system of claim 11, wherein said memory further comprising instructions executable by said processor for associating a personal record of said user with at least one of said list of telephone numbers.

15. The system of claim 11, wherein said memory further comprising instructions executable by said processor to provide at least one advertisement, wherein said advertisement is provided based on a telephone number dialed by said user.

16. A system for enhancing user interaction with Interactive Voice Response (IVR) destinations, the system comprising:
   a server processor; and
   a server memory coupled to the server processor, the server memory comprising:
      data encoding a server database, said server database comprising a list of telephone numbers associated with plurality of destinations each implementing IVR and at least one menu for the interactive voice response for each of said IVR;
      instructions executable by the server processor for automatically communicating with plurality of user devices to pull at least one menu from said server database and transfer it to display said at least one menu to the user, wherein said menu is associated with a telephone number dialed by the user.

17. The system of claim 16, wherein said memory further comprises instructions executable by the user processor to display at least one advertisement, wherein said advertisement is selected based on said telephone number dialed by the user.

18. The system of claim 16, wherein said menu comprises at least one icon.

19. The system of claim 16, wherein said memory further comprises instructions executable by the user processor for generating at least one personal record associated with said user and storing said at least one personal record in said user memory.

20. The system of claim 16, wherein said user memory further comprises instructions executable by user processor for downloading one or more activation codes associated with at least one personal record of the user.

21. The system of claim 16, wherein said user memory further comprises instructions executable by said user processor for associating a personal record of the user with at least one of said telephone numbers.

22. The system of claim 19, wherein said user memory further comprises instructions executable by said user processor to associate a code related to a business domain of at least one of said destinations with at least one personal record of said user.

23. The system of claim 16, wherein said menu is a standard menu associated with the category related to the telephone number dialed by said user.

24. The system of claim 16, wherein said server database comprises one or more time categories for said at least one menu corresponding to said plurality of destinations and wherein said instructions executable by said processor to pull said at least one menu comprise a step of checking the current time and pulling said at least one menu corresponding to the current time based on said time categories.

25. A system for enhancing user interaction with Interactive Voice Response (IVR) destinations, the system comprising:
   a processor; and
   a memory coupled to the processor, the memory comprising:
      instructions executable by the processor for automatically communicating with plurality of IVRs, and receive an information corresponding to said an interactive voice response menu sent in response to a user telephone call; and
      instructions executable by the processor to transfer said information to an Internet Protocol (IP) address associated with said user.

26. The system of claim 25, wherein said memory further comprises instructions executable by the processor to attach at least one advertisement said transfer said menu information.

27. The system of claim 25, wherein said menu information comprises at least one icon.

28. The system of claim 26, wherein said memory comprise database for IVR business categories and wherein memory comprise an instruction executable by the processor to select said advertisement base on said business category.

29. The system of claim 25, wherein said memory further comprising instructions executable by said processor for generating at least one personal record associated with said user and storing said at least one personal record in said memory.

30. The system of claim 28, wherein said instructions executable by said processor to receive said information by performing a step of checking the current time and receiving said information corresponding to the current time based on one or more time categories corresponding to said plurality of IVRs.

* * * * *